(12) United States Patent
Yamada et al.

(10) Patent No.: US 6,656,082 B1
(45) Date of Patent: Dec. 2, 2003

(54) HYBRID VEHICLE AND METHOD OF CONTROLLING THE SAME

(75) Inventors: Yoshinori Yamada, Nisshin (JP); Shigetaka Nagamatsu, Nisshin (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 60 days.

(21) Appl. No.: 09/685,065

(22) Filed: Oct. 10, 2000

(30) Foreign Application Priority Data

Oct. 12, 1999 (JP) .......................................... 11-290070
Nov. 26, 1999 (JP) .......................................... 11-335293

(51) Int. Cl.$^7$ ............................. B60K 41/02; B60K 1/00
(52) U.S. Cl. ........................................ 477/5; 180/65.2
(58) Field of Search .......................... 475/5; 477/3, 5; 180/65.2, 65.4; 290/4 C; 192/48.92, 48.2, 89.21

(56) References Cited

U.S. PATENT DOCUMENTS

| | | | |
|---|---|---|---|
| 2,436,936 A | * 3/1948 | Page | 475/5 X |
| 2,571,172 A | * 10/1951 | Rogin et al. | 475/5 |
| 4,335,429 A | * 6/1982 | Kawakatsu | 180/65.2 X |
| 5,844,342 A | 12/1998 | Miyatani et al. | |
| 6,018,198 A | * 1/2000 | Tsuzuki et al. | 180/65.2 X |
| 6,142,907 A | * 11/2000 | Minowa et al. | 477/5 |
| 6,166,499 A | * 12/2000 | Kanamori et al. | 180/65.4 X |
| 6,244,368 B1 | * 6/2001 | Ando et al. | 477/2 X |
| 6,251,037 B1 | * 6/2001 | Baumgaertner et al. | 475/5 X |
| 6,257,386 B1 | * 7/2001 | Saito et al. | 192/48.2 |
| 6,276,472 B1 | * 8/2001 | Takashima et al. | 180/65.2 |
| 6,306,057 B1 | * 10/2001 | Morisawa et al. | 475/5 |

FOREIGN PATENT DOCUMENTS

| | | |
|---|---|---|
| JP | 52-027951 | 3/1977 |
| JP | 7-301254 | 11/1995 |
| JP | 10-59011 | 3/1998 |
| JP | 10-075501 | 3/1998 |
| JP | 10-285868 | 10/1998 |
| JP | 11-270582 | 10/1999 |
| JP | 2000-37004 | 2/2000 |

* cited by examiner

*Primary Examiner*—Rodney H. Bonck
*Assistant Examiner*—Roger Pang
(74) *Attorney, Agent, or Firm*—Oblon, Spivak, McClelland, Maier & Neustadt, P.C.

(57) ABSTRACT

In a hybrid vehicle of the present invention, a clutch motor, an assist motor, and an engine are connected via a dual clutch, which includes an inner clutch arranged between an inner shaft and a middle shaft and an outer clutch arranged between the middle shaft and an outer shaft. An inner rotor of the clutch motor and the engine are linked with the inner shaft. The assist motor is linked with the middle shaft. An outer rotor of the clutch motor and an axle are linked with the outer shaft. Changing the coupling state of the middle shaft changes over the connection of the assist motor between the engine and the clutch motor. The connection of the assist motor with the clutch motor in the state of underdrive or in the case of a requirement of abrupt acceleration desirably improves the driving efficiency and ensures the smooth acceleration. Regulation of gradually enhancing the coupling force of the outer clutch in the course of the changeover of the connection of the assist motor enables the rotations of the engine and the outer rotor to be synchronized quickly, thus shortening the time required for completion of the changeover.

14 Claims, 24 Drawing Sheets

HYBRID VEHICLE AND METHOD OF CONTROLLING THE SAME

BACKGROUND OF THE INVENTION

1. Field of the Invention

The present invention relates to a hybrid vehicle having both an engine and a motor as power sources, and more specifically to a hybrid vehicle having a changeover mechanism that changes connection of the motor between a drive shaft linked with the wheels and an output shaft of the engine.

2. Description of the Related Art

A parallel hybrid vehicle is one type of the hybrid vehicles having both an engine and a motor as power sources. The parallel hybrid vehicle has a power regulation unit linked with the engine. Part of the power output from the engine is transmitted to a drive shaft linked with the wheels via the power regulation unit, while the residual power is regenerated as electric power. The regenerative electric power is accumulated in a battery or is used to drive the motor, which is used as the power source. The parallel hybrid vehicle controls the power regulation unit and the motor, so as to arbitrarily convert the revolving speed and the torque output from the engine to those suitable for the drive shaft. The hybrid vehicle selects a desirable driving point of the engine having a high driving efficiency and drives the engine at that point, irrespective of the revolving speed and the torque of the drive shaft, thus ensuring excellent resource saving effects and less emission.

In the parallel hybrid vehicle, the motor may be linked with either the drive shaft or the output shaft of the engine. When the motor is connected with the drive shaft, the engine, the power regulation unit, and the motor are linked in this order. FIG. 30 schematically illustrates the structure of a hybrid vehicle having a motor linked with a drive shaft. In the example of FIG. 30, a pair-rotor motor CM having an inner rotor IR and an outer rotor OR that are rotatable relative to each other is used as the power regulation unit. As illustrated in FIG. 30, the pair-rotor motor CM is connected to an output shaft CS of an engine EG, whereas an assist motor AM is linked with a drive shaft DS. This structure ensures the high driving efficiency in the state of underdrive when the revolving speed of the drive shaft DS is lower than that of the engine EG. This structure is called "underdrive connection" in this specification.

FIG. 31 shows power transmission in the underdrive connection when the revolving speed of the engine EG is higher than that of the drive shaft DS. The power output from the engine EG is reduced in revolving speed and enhanced in torque to be output from the drive shaft DS. The pair-rotor motor CM transmits a power PU1 output from the engine EG as a power PU2 of the reduced revolving speed. A slip occurs between two rotors in the pair-rotor motor CM, so that electric power is generated based on the slip. Part of the power PU1 is accordingly regenerated as an electric power EU1. The assist motor AM is driven with this regenerative electric power to increase the torque of the drive shaft DS. This generates a power PU3 corresponding to the required revolving speed and torque of the drive shaft DS.

FIG. 32 shows power transmission in the underdrive connection when the revolving speed of the engine EG is lower than that of the drive shaft DS. The pair-rotor motor CM carries out the power running to transmit the power PU1 output from the engine EG as a power PU4 of the raised revolving speed. The assist motor AM acts as a load to reduce its excess torque, thereby outputting the power PU3 corresponding to the required revolving speed and torque of the drive shaft DS. The assist motor AM regenerates part of the mechanical power PU4 as an electric power EU2, so as to apply the loading. This regenerative electric power is used for the power running of the pair-rotor motor CM.

In the case where the revolving speed of the engine EG is higher than that of the drive shaft DS (in the case of FIG. 31), the electric power regenerated by the pair-rotor motor CM located on the upstream side is supplied to the assist motor AM located on the downstream side in a path along which the power output from the engine EG is transmitted to the drive shaft DS. In the case where the revolving speed of the engine EG is lower than that of the drive shaft DS (in the case of FIG. 32), on the other hand, the electric power regenerated by the assist motor AM located on the downstream side is supplied to the pair-rotor motor CM located on the upstream side. The electric power supplied to the pair-rotor motor CM is subsequently supplied to the assist motor AM located on the downstream side as a mechanical power. This results in a circulation of power γ1 as shown in FIG. 32. The circulation of power γ1 reduces the effective power transmitted to the drive shaft DS out of the power output from the engine EG, thus lowering the driving efficiency of the hybrid vehicle.

When the motor is connected with the output shaft of the engine, on the other hand, the engine, the motor, and the power regulation unit are linked in this order. FIG. 33 schematically illustrates the structure of the hybrid vehicle having the motor linked with the output shaft of the engine. In the example of FIG. 33, the assist motor AM is linked with the output shaft CS of the engine EG, whereas the pair-rotor motor CM functioning as the power regulation unit is connected with the drive shaft DS. This structure ensures the high driving efficiency in the state of overdrive when the revolving speed of the drive shaft DS is higher than the revolving speed of the engine EG. This structure is called "overdrive connection" in this specification.

FIG. 34 shows power transmission in the overdrive connection when the revolving speed of the engine EG is higher than that of the drive shaft DS. FIG. 35 shows power transmission in the overdrive connection when the revolving speed of the engine EG is lower than that of the drive shaft DS. Only the pair-rotor motor CM is capable of regulating the revolving speed of the transmitted power. The phenomena occurring in the overdrive connection are just opposite to those occurring in the underdrive connection. In the case where the revolving speed of the engine EG is higher than that of the drive shaft DS (in the case of FIG. 34), an electric power EO1 regenerated by the pair-rotor motor CM located on the downstream side is supplied to the assist motor AM located on the upstream side. In the case where the revolving speed of the engine EG is lower than that of the drive shaft DS (in the case of FIG. 35), on the other hand, an electric power EO2 regenerated by the assist motor AM located on the upstream side is supplied to the pair-rotor motor CM located on the downstream side. In the structure that the motor is linked with the output shaft of the engine, a circulation of power γ2 occurs in the case of FIG. 34. This lowers the driving efficiency of the hybrid vehicle.

In the hybrid vehicle, a high efficiency driving area defined by the vehicle speed and the output torque depends upon the connection of the assist motor AM. One proposed technique changes the connection of the assist motor AM between the engine and the drive shaft, in order to improve the driving efficiency of the hybrid vehicle over a wide range.

A diversity of problems, however, arise in the process of changing the connection of the assist motor AM. A concrete example of the changeover mechanism is described here. FIG. 36 illustrates the structure of a hybrid vehicle in which the connection of the assist motor AM is changeable. The connection of the assist motor AM is changed by means of a synchronized gear unit including three gears SG1, SG2, and SG3. A rotor of the assist motor AM is linked with the gear SG3 that is slidable in the direction of the arrow. The gears SG1 and SG2 are respectively connected to the rotating shafts of the clutch motor CM and the engine EG. Sliding the gear SG3 as shown by the arrow enables the connection of the assist motor AM to be changed.

The synchronized gear unit requires a certain space, in which the gear SG3 is movable in the axial direction. This results in making the whole changeover system undesirably bulky. The size expansion of the changeover system is a significant problem especially on a vehicle, since the allowable space for mounting the power system is restricted in the vehicle. In the synchronized gear unit, the gear SG3 moves by a relatively long stroke between the gears SG2 and SG1 in the course of the changeover. The changeover accordingly requires a relatively long time. The changeover is implemented via a neutral state, in which the gear SG3 is coupled neither with the gear SG2 nor with the gear SG1. This causes a torque drop to instantaneously lower the power of the drive shaft.

The above description regards the structure using the synchronized gear unit. The same problem of making the whole changeover system undesirably bulky is also found in another structure using two clutches that are arranged in the axial direction to connect and disconnect the assist motor with and from the engine or the clutch motor. Another disadvantage of this structure is that the successive changeover of the two clutches requires a relative long time period.

SUMMARY OF THE INVENTION

The object of the present invention is thus to provide a hybrid vehicle, in which a changeover of connection of a motor is carried out with a small-sized changeover mechanism within a short time period.

At least part of the above and the other related objects is attained by a hybrid vehicle, which includes: an engine having an output shaft; a drive shaft from which driving power is output; a power regulation unit that is connected with both the output shaft and the drive shaft to vary power output from the engine through an input and an output of electric power and transmit the varying power to the drive shaft; a motor having a rotating shaft; and a changeover mechanism that changes connection of the rotating shaft of the motor between the output shaft and the drive shaft. The changeover mechanism is a dual clutch that includes a first clutch and a second clutch respectively arranged inside and outside the rotating shaft of the motor, the first clutch connecting and disconnecting the rotating shaft with and from the output shaft, the second clutch connecting and disconnecting the rotating shaft with and from the drive shaft.

The dual clutch ensures a space-saving layout of the rotating shaft, the output shaft, and the drive shaft and thereby reduces the size of the whole changeover system. The dual clutch includes two clutches aligned in the radial direction and has a greater dimension in the radial direction than that of a single clutch. The power system of the hybrid vehicle, however, has relatively large-sized constituents, that is, the motor, the power regulation unit, and the engine, arranged in the radial direction. The size expansion of the changeover mechanism in the radial direction accordingly does not lead to any significant expansion of the size of the whole changeover system. Application of the dual clutch, on the other hand, shortens the dimension in the axial direction, which gives a significant contribution to the size reduction of the whole changeover system.

The dual clutch also enables the connection of the motor to be changed quickly. This is because the changeover does not accompany a shift of any gear in the structure of the present invention, unlike the structure of FIG. 36 using the synchronized gear unit. The present invention implements the changeover not via the neutral state, thus effectively preventing a torque drop.

A variety of arrangements may be applicable to the dual clutch. Especially preferable is a dual clutch actuated by electromagnetic force. Regulation of the electromagnetic force enables the operations of the dual clutch to be controlled relatively easily with a high accuracy and a high response.

The dual clutch may be an electromagnetic roller clutch using rollers as coupling elements. The roller clutch that has a relatively small size but is able to transmit a relatively large power is desirably used for the changeover mechanism of the present invention. The dual clutch is, however, not restricted to the roller clutch, but may have a structure in which two clutch plates are attracted to and separated from each other by the function of electromagnetic force.

The connection of the motor may be changed manually.

It is, however, preferable that the hybrid vehicle of the present invention further includes: a decision unit that determines whether or not a changeover of connection of the motor is required, based on driving conditions of the hybrid vehicle and a current connecting state of the motor; and a changeover controller that controls the changeover mechanism to change the connection of the motor when the changeover is required.

This arrangement enables the connection of the motor to be changed adequately according to the driving conditions of the hybrid vehicle. For example, this arrangement changes the connection of the motor to prevent the circulation of power discussed previously with FIGS. 30 through 35. This preferably improves the driving efficiency of the hybrid vehicle.

The requirement of the changeover is determined in a variety of ways.

For example, the decision unit determines that the changeover of connection of the motor is required when an increment of a required torque to be output from the drive shaft is not less than a predetermined level while the motor is linked with the output shaft of the engine.

This corresponds to a changeover from the structure of FIG. 33 to the structure of FIG. 30 in response to an abrupt increase in required torque. As described previously, the structure of FIG. 33 ensures the high driving efficiency when the revolving speed of the engine is lower than that of the drive shaft. The structure of FIG. 30, on the other hand, ensures the high driving efficiency under the opposite condition. In the case of an abrupt increase in required torque, the driver generally desires abrupt acceleration. This raises the revolving speed of the drive shaft, and it is expected that the structure of FIG. 30 gives the higher driving efficiency. The hybrid vehicle of the above application thus carries out the changeover of connection of the motor to the structure of FIG. 30 in response to the abrupt increase in required torque.

The decision with regard to the requirement of the changeover advantageously ensures the quick acceleration, in addition to the improvement in driving efficiency. It is desirable that the motor outputs a torque in addition to the output of the engine in the course of acceleration. In the case where the motor is connected with the output shaft of the engine, the whole torque is output via the power regulation unit located on the downstream side. There is accordingly a fair possibility that the upper limit of the torque output from the drive shaft is restricted by the capability of torque transmission of the power regulation unit. In the case where the motor is connected with the drive shaft, on the other hand, a large torque can be output from the drive shaft without such limitations. This structure thus ensures a sufficient acceleration.

It is preferable that the changeover controller includes: a first controller that causes a released clutch between the first clutch and the second clutch to be coupled in an allowable range according to a difference between rotating states of two shafts linked with the released clutch, thus reducing the difference between the rotating states of the two shafts; and a second controller that causes a changeover to be carried out between the first clutch and the second clutch when it is determined that the rotating states of the two shafts satisfy a predetermined coupling condition with regard to the released clutch by the execution of the first controller.

In order to couple the released clutch, it is required to make the revolving speeds of the two shafts linked with the released clutch substantially coincident with each other. One possible method controls the power regulation unit and the other constituents linked with the two shafts to equalize the revolving speeds of the two shafts. The control technique adopted in the above arrangement causes the released clutch to be coupled in an allowable range of the clutch even when the two shafts have different rotating states, and gradually synchronizes the rotating states of the two shafts, at least one of their revolving speeds and the torques. This arrangement ensures the quick synchronization of the rotations of the two shafts and desirably shortens the time required for completion of the changeover. This control technique may be adopted alone or in combination with the control of the power regulation unit and the other constituents linked with the released clutch.

The released clutch can be coupled in the allowable range of the clutch in a variety of ways. In one embodiment, the released clutch is coupled with a higher coupling force against a decrease in revolving speed difference between the two shafts. In another embodiment the coupling force of the released clutch is varied in a stepwise manner. In still another embodiment the released clutch may be coupled while the coupling force of the released clutch is varied in a fluctuating manner.

The first and the second embodiment represent to the half coupled state. When the two shafts have a significant difference in revolving speed, the clutch is coupled with a small coupling force to cause a slip. The function of a frictional force acting between the two shafts causes the revolving speeds of the two shafts to be substantially coincident with each other. A gradual increase in coupling force with a decrease in revolving speed difference enables the revolving speeds to be synchronized quickly. In the second application, the coupling force may be varied by several steps until the rotating states of the two shafts satisfy the coupling condition. The coupling force to cause the slip may alternatively be kept until the rotating states of the two shafts satisfy the coupling condition. The second application of varying the coupling force in a stepwise manner advantageously facilitates the regulation of the clutch. This simplifies the circuit structure of the clutch that works by the function of electromagnetic force.

In the third embodiment, the coupling force may be varied according to the impact torque generated on the clutch in the coupling process. Coupling the clutch under the condition that the two shafts have significantly different rotating states causes a large impact torque to act due to the inertia. A decrease in coupling force reduces the torque applied to the clutch and effectively prevents the life of the clutch from being extremely shortened. The impact torque acting previously reduces the difference in rotating state between the two shafts. The arrangement of varying the coupling force of the clutch in a fluctuating manner also shortens the time required for completion of the changeover.

In accordance with preferred embodiment of the control procedure to shorten the time required for completion of the changeover, the changeover mechanism includes a roller clutch acting by the function of electromagnetic force and attains at least three different coupling states, that is, a released state, a fully coupled state to allow transmission of a torque via rollers, and a partly coupled state to allow transmission of a torque not via the rollers in a range lower than the torque transmittable in the fully coupled state. In this arrangement, the first controller causes the released clutch to gain coupling in the partly coupled state. The partly coupled state corresponds to a transient state, via which the clutch shifts from the released state to the coupled state.

It is also preferable that the first controller causes the roller clutch to be coupled in an intermittent manner. This arrangement requires simple binary regulation, that is, on-off regulation, of the electromagnetic force that drives the clutch, thus simplifying the control procedure.

Regardless of the execution or non-execution of the control procedure to shorten the time required for completion of the changeover, it is desirable that the changeover is implemented via a state in which both the first clutch and the second clutch are in a coupled state. This arrangement effectively prevents a torque drop in the course of the changeover and ensures a smooth drive of the hybrid vehicle.

In the hybrid vehicle of the present invention, a variety of structures are applicable to the power regulation unit.

For example, the power regulation unit includes a pair-rotor motor having a first rotor linked with the output shaft and a second rotor linked with the drive shaft.

The pair-rotor motor enables the power to be transmitted from one rotor to the other rotor through electromagnetic coupling of the two rotors. The pair-rotor motor also enables part of the power to be regenerated in the form of electric power by means of a relative slip between the two rotors. The pair-rotor motor having these two functions is desirably used as the power regulation unit.

In accordance with another preferable embodiment, the power regulation unit includes: a generator having a rotor shaft; and a planetary gear unit having three rotating shafts, which are respectively linked with the output shaft, the drive shaft, and the rotor shaft.

This arrangement enables the power produced by rotations of the output shaft to be distributed and transmitted to the drive shaft and the rotor shaft, based on the general actions of the planetary gear unit. Part of the power input into the output shaft is accordingly transmitted to the drive shaft, and the power distributed to the rotor shaft is regenerated as electric power by the generator. These two factors ensure the functions of the power regulation unit.

These and other objects, features, aspects, and advantages of the present invention will become more apparent from the following detailed description of the preferred embodiment with the accompanying drawings.

DESCRIPTION OF THE PREFERRED EMBODIMENT

Figure 1:
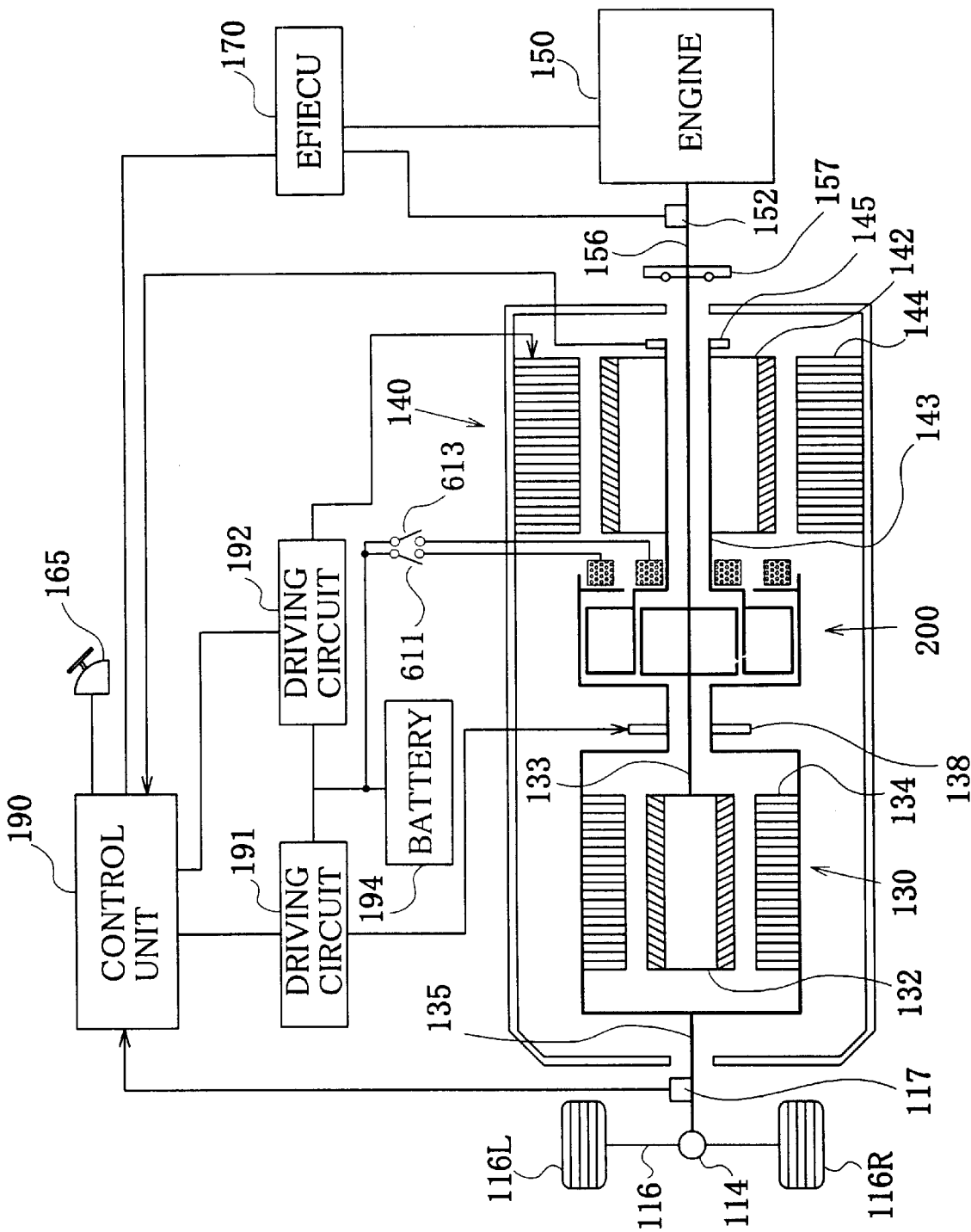
FIG. 1 schematically illustrates the structure of a hybrid vehicle in one embodiment of the present invention.

Preferred embodiments of the present invention will be described below in the following order:

A. Structure of System
B. Structure of Dual clutch
C. Connection in Power System
D. General Operations
E. Drive Control Process
F. Connecting State Changeover Control
G. Coupling of Released Clutch
H. Effects
I. Modification A. Structure of System FIG. 1 schematically illustrates the structure of a hybrid vehicle in one embodiment of the present invention. The hybrid vehicle has a power system including an engine 150, a clutch motor 130, and an assist motor 140. As described later, connection of the assist motor 140 is changed between the engine 150 and the clutch motor 130.

The engine 150 is a conventional gasoline engine. Operations of the engine 150 are controlled by an EFIECU (Electronic Fuel Injection and Engine Control Unit) 170. The EFIECU 170 is a one-chip microcomputer including a CPU, a ROM, and a RAM. The CPU controls, for example, fuel injection of the engine 150 according to a program stored in the ROM. In order to execute such control processes, a diversity of sensors indicating driving conditions of the engine 150 are connected to the EFIECU 170. One of such sensors is a speed sensor 152 that measures a revolving speed of a crankshaft 156. Other sensors and switches are omitted from the illustration. The EFIECU 170 is electrically connected to a main control unit 190 and transmits various information to and from the main control unit 190. The EFIECU 170 controls the engine 150 in response to a variety of command values with regard to the driving conditions of the engine 150 output from the main control unit 190.

The crankshaft 156 of the engine 150 is connected to an inner rotor 132 of the clutch motor 130 via a damper 157. The clutch motor 130 is a pair-rotor motor that has the inner rotor 132 linked with an inner rotor shaft 133 and an outer rotor 134 linked with a drive shaft 135, where the inner rotor 132 and the outer rotor 134 are rotatable relative to each other. The outer rotor 134 is connected with an axle 116 with driving wheels 116R and 116L via the drive shaft 135 and a differential gear 114. The clutch motor 130 works as a motor with electric power supply. The clutch motor 130 also functions as a generator when an external force is applied to rotate the inner rotor 132 and the outer rotor 134. The clutch motor 130 may be a sine-wave magnetized motor, in which the magnetic flux density between the inner rotor 132 and the outer rotor 134 has a sine distribution in a circumferential direction. In this embodiment, however, a non-sine wave magnetized motor that is capable of outputting relatively large torques is used as the clutch motor 130.

Since both the inner rotor 132 and the outer rotor 134 are rotatable, the clutch motor 130 enables the power input from one of them to be transmitted to the other. The clutch motor 130 carries out the power running to transmit the enhanced power to the other, and carries out regenerative operation to take out part of the mechanical power in the form of electric power while transmitting the residual mechanical power. No power is transmitted when the clutch motor 130 carries out neither the power running nor the regenerative operation. This state is achieved by the release of a mechanical clutch.

The outer rotor 134 is electrically connected to a battery 194 via a slip ring 138 and a driving circuit 191. The driving circuit 191 is constructed as a transistor inverter having a plurality of transistors as switching elements, and is electrically connected with the main control unit 190. The main control unit 190 performs PWM (pulse width modulation) control on the on- and off-time of the transistors in the driving circuit 191. The three-phase alternating current, with the battery 194 as the power source, then flows through the outer rotor 134 via the slip ring 138 to rotate the clutch motor 130.

The assist motor 140 is constructed as a synchronous motor generator like the clutch motor 130, and includes a rotor 142 with a plurality of permanent magnets attached to an outer circumferential face thereof and a stator 144 with three-phase coils wound thereon to form a revolving magnetic field. The assist motor 140 is connected to the battery 194 via a driving circuit 192. The driving circuit 192 is also constructed as a transistor inverter. The main control unit 190 switches on and off the transistors in the driving circuit 192 to generate a revolving magnetic field of the stator 144 and rotate the assist motor 140. In this embodiment, a non-sine wave magnetized motor is used as the assist motor 140.

The assist motor 140, the clutch motor 130, and the engine 150 are respectively linked with a dual clutch 200. In the power system of this embodiment, the position of the engine 150 is referred to as an upstream side and the position of the axle 116 is referred as a downstream side. As described before, the dual clutch 200 changes the connection of the assist motor 140 between the upstream side of the clutch motor 130 and the downstream side of the clutch motor 130.

B. Structure of Dual clutch

Figure 2:
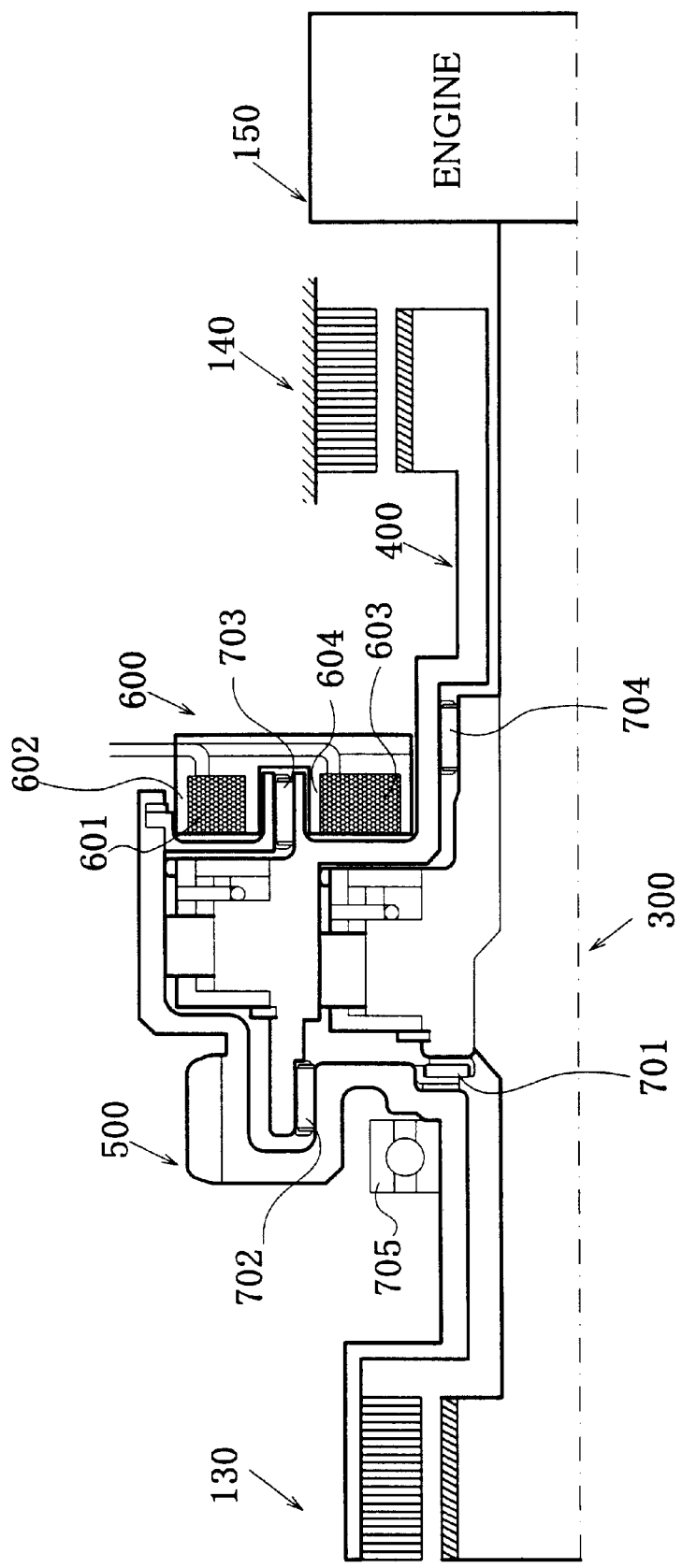
FIG. 2 schematically illustrates the structure of a dual clutch mounted on the hybrid vehicle of FIG. 1.

FIG. 2 schematically illustrates an upper half of the dual clutch 200 including an axis of rotation. The dual clutch 200 includes three rotary units and one stationary unit 600. The rotary units are an inner rotary unit 300, a middle rotary unit 400, and an outer rotary unit 500, which are arranged in this sequence radially from the axis of rotation. These rotary units 300 through 500 are assembled with bearings 701 through 705 to be rotatable relative to one another. The bearings 701 through 704 are needle bearings, and the bearing 705 is a ball bearing. In the structure of the embodiment, the inner rotary unit 300, the middle rotary unit 400, and the outer rotary unit 500 are respectively connected with the engine 150, the assist motor 140, and the outer rotor 134 of the clutch motor 130. The configurations of the stationary unit 600 and the respective rotary units 300 through 500 are discussed more in detail.

The stationary unit 600 is made of a magnetic material and has cores 602 and 604 to respectively receive electromagnet coils 601 and 603 therein. The stationary unit 600 is fixed to a casing of the dual clutch 200 with bolts. Supplies of electric power are fed from the battery 194 to the coils 601 and 603 as shown in FIG. 1 and regulated by on-off operations of switches 611 and 613, respectively.

Figure 3:
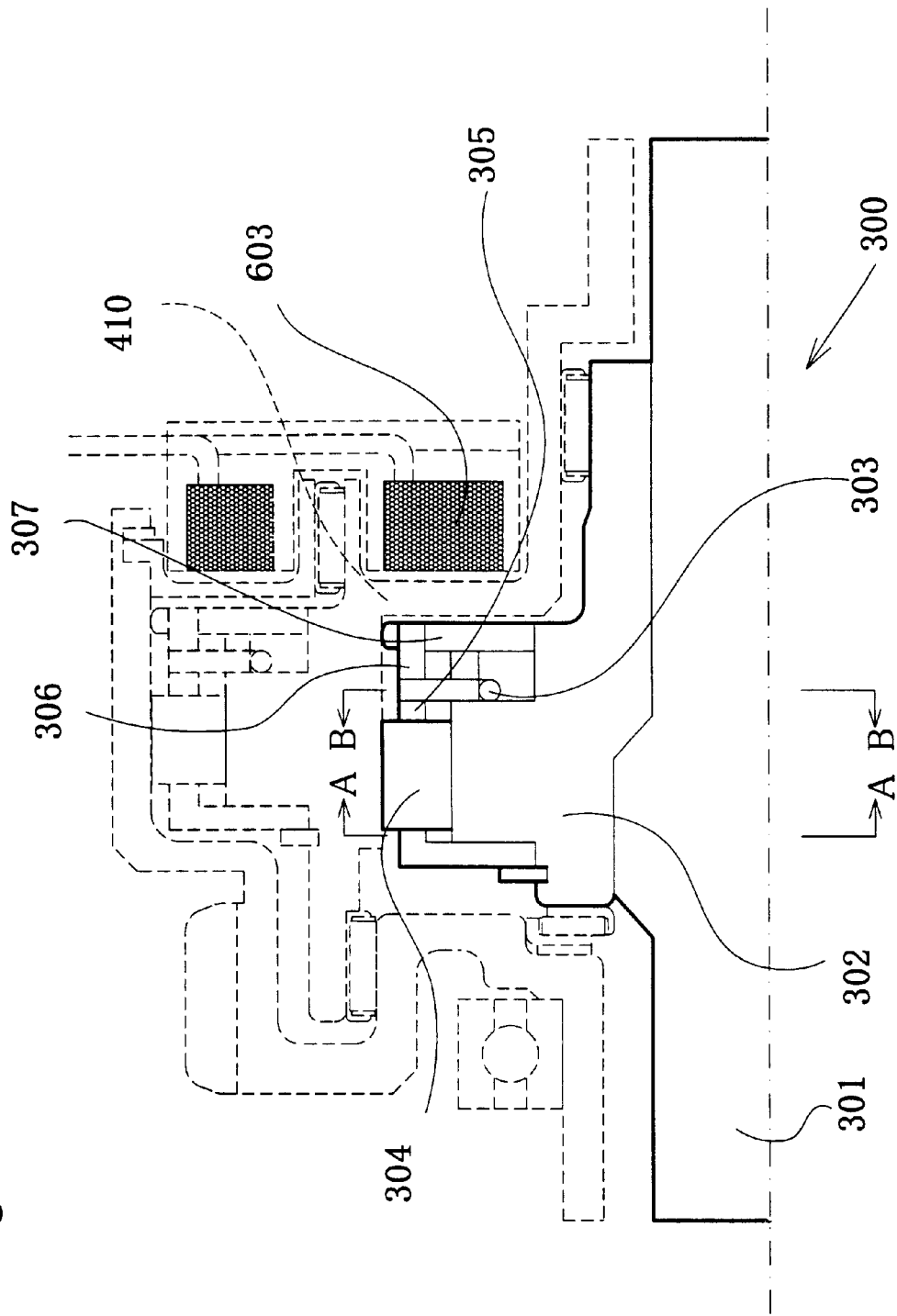
FIG. 3 illustrates the structure of an inner rotary unit included in the dual clutch.
Figure 4:
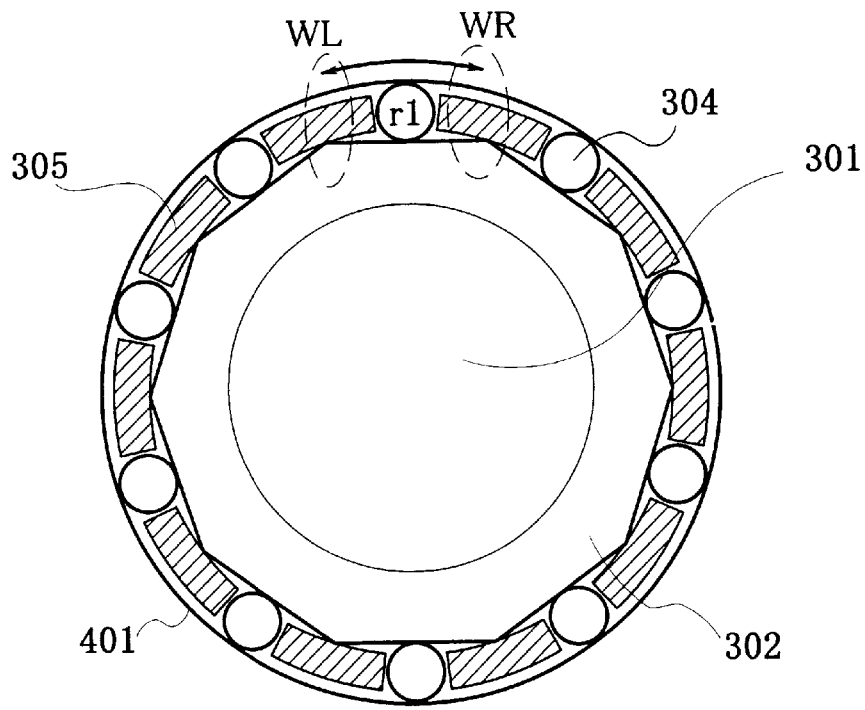
FIG. 4 is a sectional view of the inner rotary unit taken on the line A—A of FIG. 3.

FIG. 3 shows the structure of the inner rotary unit 300. The part defined by the solid lines represents the inner rotary unit 300. The inner rotary unit 300 has an inner shaft 301 working as a power transmission shaft. A cam 302 is fixed to the outer circumference of the inner shaft 301. FIG. 4 is a sectional view of the inner rotary unit 300 taken on the line A—A of FIG. 3. The cam 302 has a cross section of a regular decagon. The middle rotary unit 400 has a middle shaft 401 working as a power transmission shaft and having an inner circumferential face of a circular cross section. The interval between the inner circumferential face of the middle shaft 401 and the outer circumferential face of the cam 302 is narrower near each vertex of the regular decagon and wider near the center of each side of the regular decagon to form a wedge-like space. The cam 302 may be integrated with the inner shaft 301.

A support member 305 and rollers 304 are mounted on the outer circumference of the cam 302 to be rotatable in the circumferential direction. Referring to FIG. 4, the support member 305 has ten pockets arranged in the circumferential direction to receive ten rollers 304, respectively. The diameter of each roller 304 is smaller than the maximum interval between the middle shaft 401 and the cam 302 but is greater than the minimum, interval. When the roller 304 is located in the vicinity of the center of each wedge-like space, there is a clearance between the cam 302, the roller 304, and the middle shaft 401. Power is accordingly not transmitted between the inner shaft 301 and the middle shaft 401.

When a roller r1 (304) moves in the circumferential direction as shown by the arrow in FIG. 4 to approach either one of ends WR and WL of the wedge-like space, the cam 302, the roller 304, and the middle shaft 401 couple integrally with one another to enable power transmission between the inner shaft 301 and the middle shaft 401. In the case where the inner shaft 301 rotates clockwise, the roller 304 gains coupling at the end WL to enable transmission of power to the middle shaft 401. In the case where the inner shaft 301 rotates counterclockwise, on the other hand, the roller 304 gains coupling at the end WR to enable transmission of power to the middle shaft 401.

Figure 5:
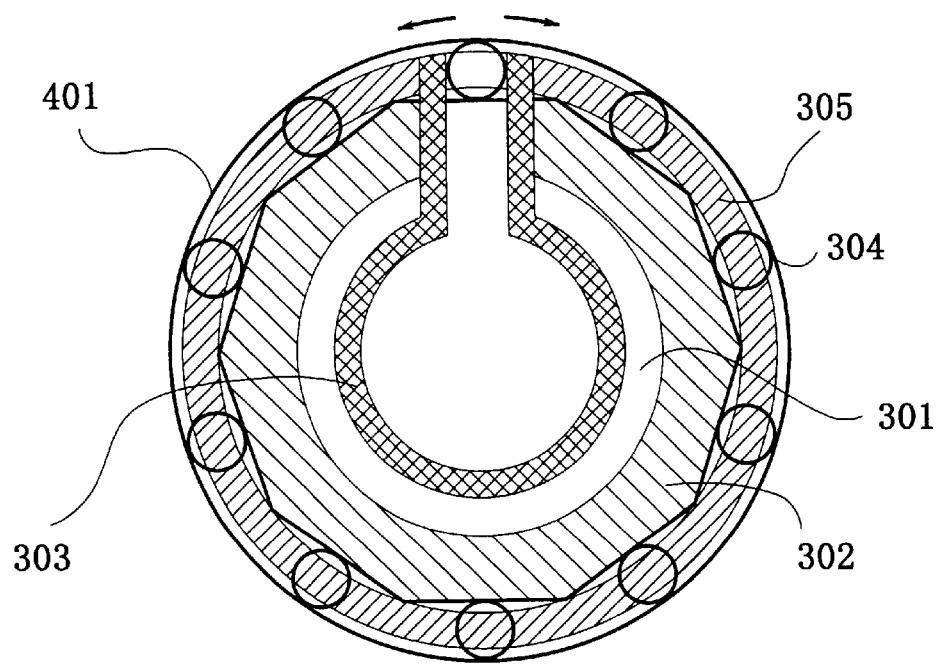
FIG. 5 is a sectional view of the inner rotary unit taken on the line B—B of FIG. 3.

In this manner, the dual clutch 200 of this embodiment connects and disconnects the inner shaft 301 with and from the middle shaft 401 according to the position of the rollers 304. The following describes a mechanism of regulating the position of the rollers 304. Referring back to FIG. 3, the support member 305 and the cam 302 hold a switch spring 303 on one end thereof. FIG. 5 is a sectional view of the inner rotary unit 300 taken on the line B—B of FIG. 3. Both the cam 302 and the support member 305 have notches, in which the switch spring 303 is set. The switch spring 303 causes the elastic force to act in the directions shown by the arrows in FIG. 5. While no external force is applied, the switch spring 303 keeps the support member 305 at the illustrated position, that is, in a neutral state.

As shown in FIG. 3, the support member 305 also has a columnar projection 306 fixed at several positions on the other end opposite to the switch spring 303. The columnar projection 306 has a disc-shaped armature 307 set thereon. The projection 306 causes the armature 307 to rotate integrally with the support member 305. The armature 307 is, however, not fixed to the projection 306 but is simply set on the projection 306 via a little clearance to be movable in the direction of the axis of rotation.

When electricity is supplied to the coil 603, the armature 307 is attracted to a radially-extending side face 410 of the middle shaft 401 to rotate integrally with the radially-extending side face 410. Since the armature 307 is attracted to the radially-extending side face 410 with a sufficiently strong force, the support member 305 moves in the circumferential direction against the elastic force of the switch spring 303. The rollers 304 accordingly move in the circumferential direction, so that the inner shaft 301 couples with the middle shaft 401 as discussed previously with FIG. 4. In the dual clutch 200, the cam 302, the rollers 304, the support member 305, the projection 306, the armature 307, the switch spring 303, the coil 603, and the radially-extending side face 410 constitute an inner electromagnetic clutch unit. The armature 307 and the radially-extending side face 410 correspond to a frictional coupling member of the inner electromagnetic clutch unit.

Figure 6:
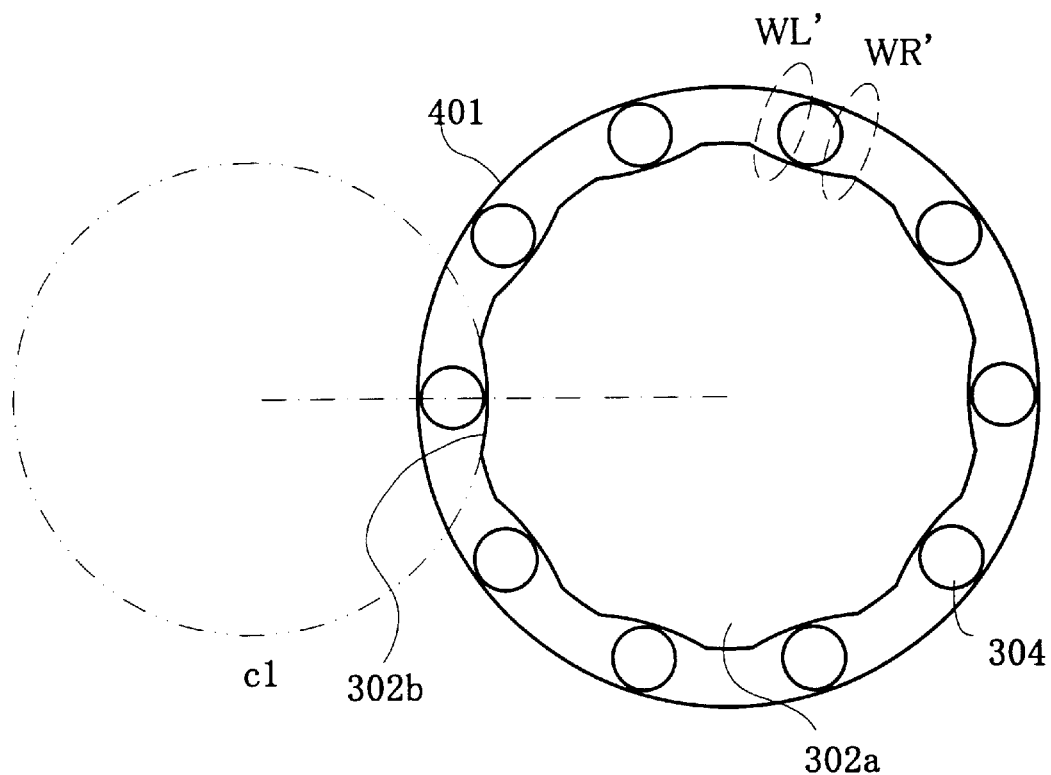
FIG. 6 shows a cross sectional shape of another cam in one modified example.

The cam 302 may have a diversity of cross sectional shapes other than the decagonal shape shown in FIG. 4. FIG. 6 shows a cross sectional shape of another cam 302a in one modified example. In the embodiment of FIG. 4, the cam 302 has planar outer circumferential sides to form the wedge-lie spaces. In the modified example of FIG. 6, on the other hand, the cam 302a has inwardly convex arc-shaped sides 302b. Each arc-shaped side 302b has a radius of curvature c1 that is substantially equivalent to the outer radius of the cam 302a. This cross sectional shape makes the interval between the outer circumference of the cam 302a and the inner circumference of the middle shaft 401 abruptly narrower in the circumferential direction, compared with the interval in the embodiment of FIG. 4. This advantageously facilitates the coupling of the rollers 304. Each roller 304 located in the neutral position slightly moves in the circumferential direction to gain coupling in an area WR' or in an area WL'. The cross sectional shape of the modified example accordingly reduces the possible backlash in the case of a change in rotating direction. The cam is not restricted to the shapes of the embodiment and this modified example, but may have a diversity of other cross sectional shapes that ensure formation of wedge-like spaces between the inner circumferential face of the middle shaft 401 and the outer circumferential face of the cam.

Figure 7:
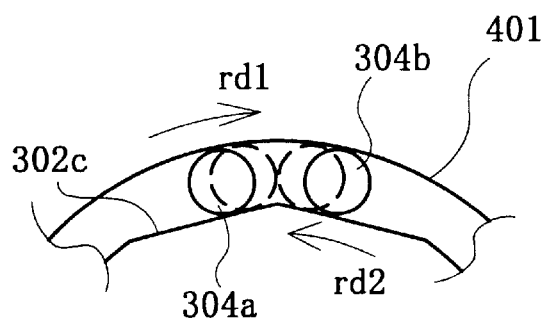
FIG. 7 is a sectional view illustrating a cam and rollers in another modified example.

The clutch unit may hold the rollers in a different configuration. FIG. 7 is a sectional view illustrating a cam 302c and rollers 304a and 304b in a modified example. Only part of the cam 302c is shown in FIG. 7. In the embodiment of FIG. 4, one roller 304 is located in each of the wedge-like spaces and gains coupling by both the clockwise rotation and the counterclockwise rotation. In the modified example of FIG. 7, on the other hand, two rollers 304a and 304b are selectively used according to the rotating direction. In the modified example of FIG. 7, in the neutral state, the rollers 304a and 304b are kept at specific positions that are deviated from the centers of the respective sides of the cam 302c to be closer to each other. In the case where the middle shaft 401 rotates in the direction of an arrow rd1, the roller 304a moves to the position defined by the broken line to gain coupling. In the case where the middle shaft 401 rotates in the direction of an arrow rd2, on the contrary, the other roller 304b moves to the position defined by the broken line to gain coupling. Namely one between the pair of rollers selectively moves to gain coupling according to the rotating direction. This arrangement ensures the quick coupling and reduces the possible backlash. The structure of the cam and the rollers is not restricted to those of the embodiment and this modified example, but may have a diversity of other configurations as long as the configuration of the cam and the rollers attains both the coupled state and the released state. For example, a plurality of rollers may be located in each wedge-like space.

Figure 8:
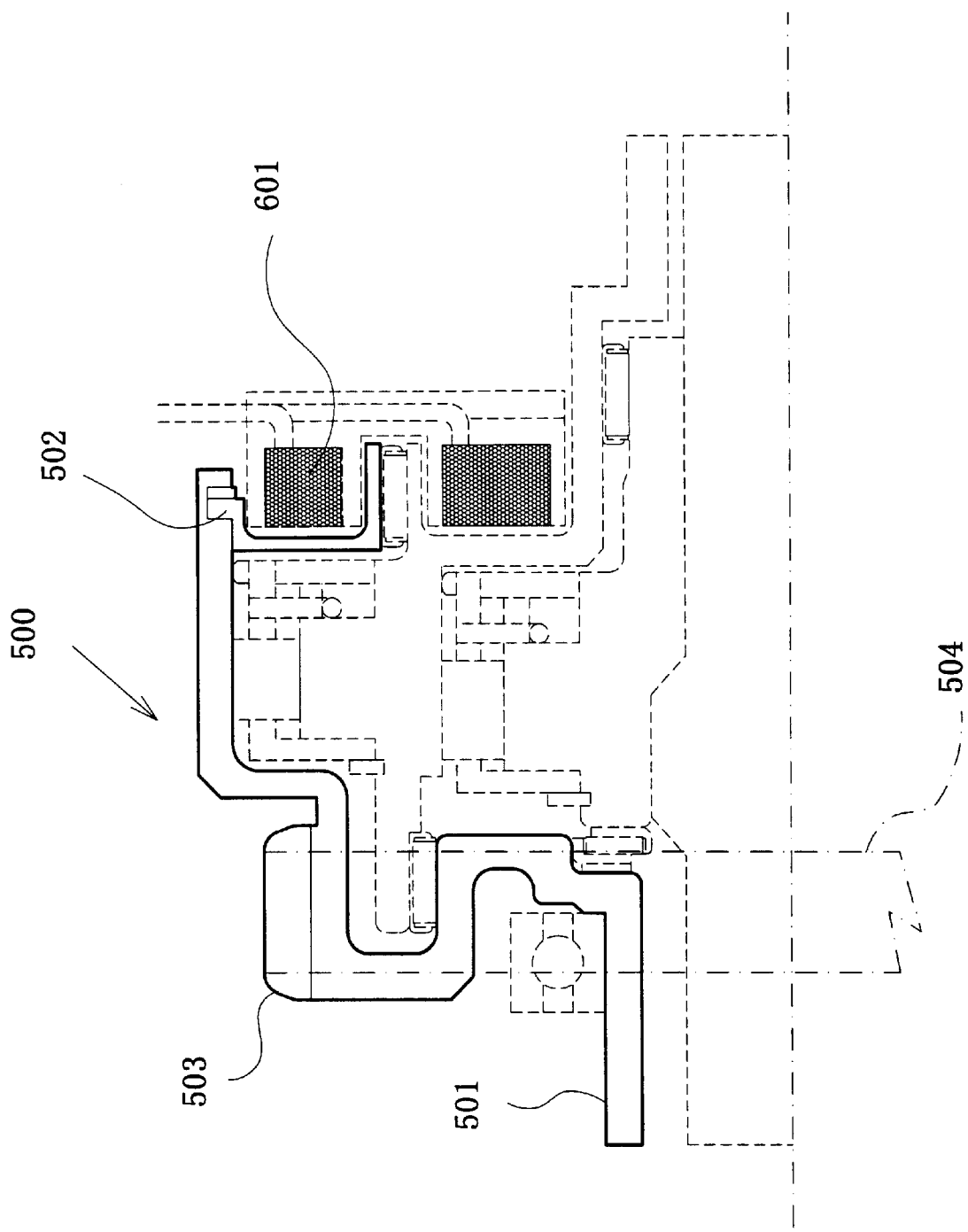
FIG. 8 illustrates the structure of an outer rotary unit included in the dual clutch.

The structure of the outer rotary unit 500 is described with FIG. 8. The part defined by the solid lines represents the outer rotary unit 500. The outer rotary unit 500 has an outer shaft 501 working as a power transmission shaft. A ring-shaped rotor 502 is set on the outer shaft 501 to face the coil 601. The rotor 502 is made of a magnetic material and is fixed to rotate integrally with the outer shaft 501. There is a little clearance between the rotor 502 and the coil 601 not to interfere with rotations of the rotor 502. The rotor 502 works as a frictional coupling member of an outer electromagnetic clutch unit. The outer shaft 501 may have a sprocket 503, in order to enable a chain belt 504 to extract the power of the outer shaft 501.

Figure 9:
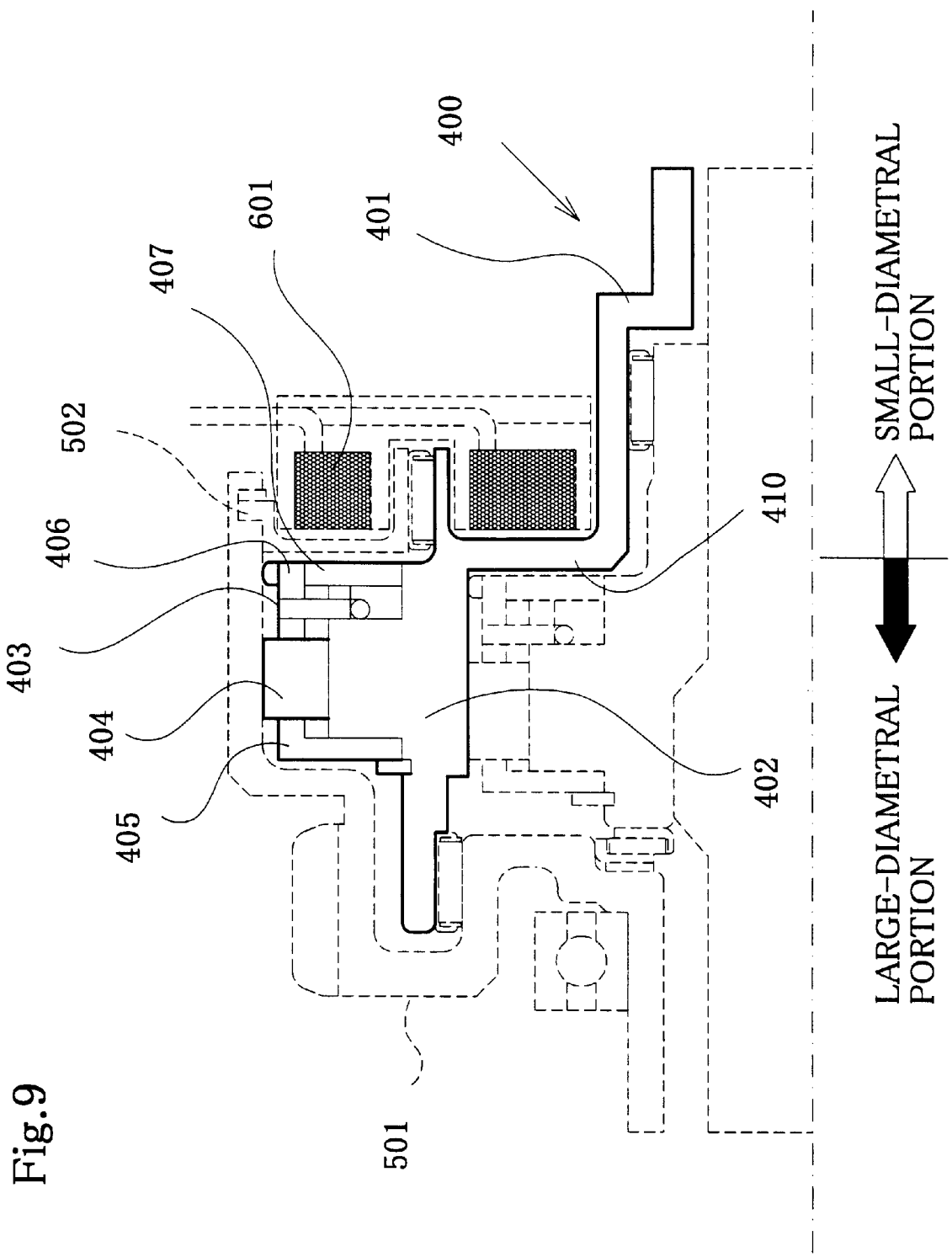
FIG. 9 illustrates the structure of a middle rotary unit included in the dual clutch.

The structure of the middle rotary unit 400 is described with FIG. 9. The part defined by the solid lines represents the middle rotary unit 400. The middle rotary unit 400 has the middle shaft 401 working as the power transmission shaft as mentioned previously. The middle shaft 401 is composed of steel and has a large-diametral portion and a small-diametral portion across the disc-shaped radially-extending side face 410. The outer electromagnetic clutch unit is disposed between the outer circumference of the large-diametral portion and the outer shaft 501. The outer electromagnetic clutch unit has a substantially similar configuration to that of the inner electromagnetic clutch unit. A cam 402 is fixed to the outer circumference of the large-diametral portion of the middle shaft 401. A support member 405 with rollers 404 and a switch spring 403 are mounted on the outer circumference of the cam 402. The support member 405 has a projection 406, on which an armature 407 is set. These constituents, the rotor 502, and the coil 601 constitute the outer electromagnetic clutch unit. The operations of the outer electromagnetic clutch unit are substantially the same as those of the inner electromagnetic clutch unit and are thus not specifically described here. As mentioned previously, the cam 402 and the other related elements mounted on the outer circumferential face of the middle shaft 401 are included in the outer electromagnetic clutch unit, whereas the inner circumferential face and the radially-extending side face 410 of the middle shaft 401 are included in the inner electromagnetic clutch unit.

A control mechanism for switching over the dual clutch 200 is described here. As shown in FIG. 1, the coils 601 and 603 of the dual clutch 200 are connected to the battery 194 respectively via the switches 611 and 613. The switches 611 and 613, which are schematically illustrated in FIG. 1, are transistors working as switching elements. The main control unit 190 controls the on-off state of the switches 611 and 613. Regulating the duties with regard to the activated switching elements results in controlling the voltages of the coils 601 and 603. The two shafts may be coupled with each other by gradually varying the intensities of attraction of the armatures 307 and 407 with time. A variety of switching elements, such as thyristors, or relays may be applicable for the switches 611 and 613.

C. Connection in Power System

Figure 10:
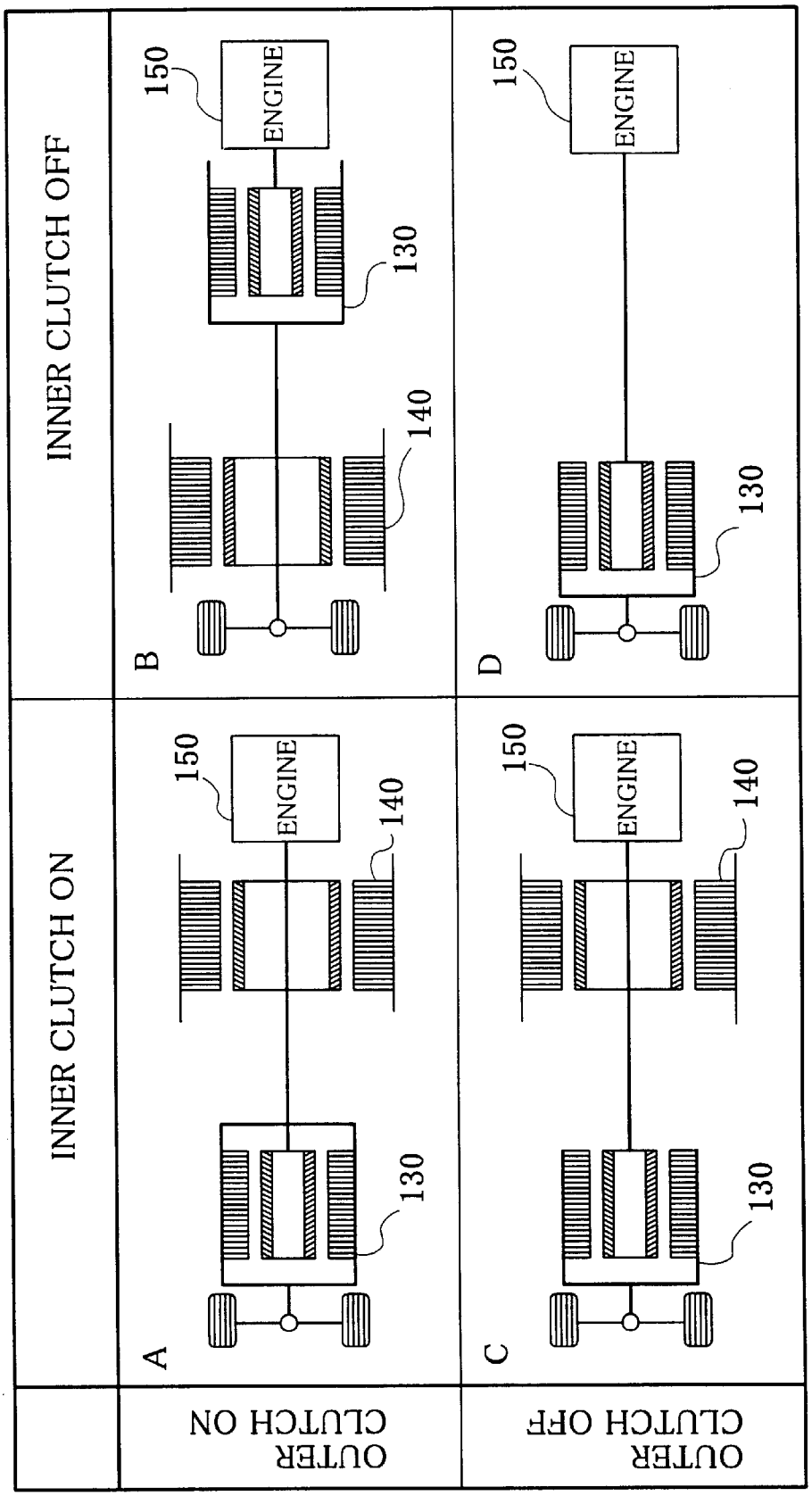
FIG. 10 shows the state of the power system under the respective on-off conditions of the dual clutch in the hybrid vehicle of the embodiment.

The following describes the operations of the dual clutch 200 of the embodiment and the connection in the power state attained by such operations. FIG. 10 shows the state of the power system under the respective on-off conditions of the dual clutch 200 in the hybrid vehicle of the embodiment. The switchover of the dual clutch 200 changes the connection of the hybrid vehicle among four different connecting states A through D.

In the connecting state A, both the inner clutch and the outer clutch are in ON position; that is, electricity is supplied to both the coils 601 and 603. In this case, both the inner clutch and the outer clutch gain coupling to rotate the inner shaft 301, the middle shaft 401, and the outer shaft 501 integrally. Namely the connecting state A is equivalent to the configuration in which the clutch motor 130 does not work and the engine 150 and the assist motor 140 are directly linked with the drive shaft.

Figure 30:
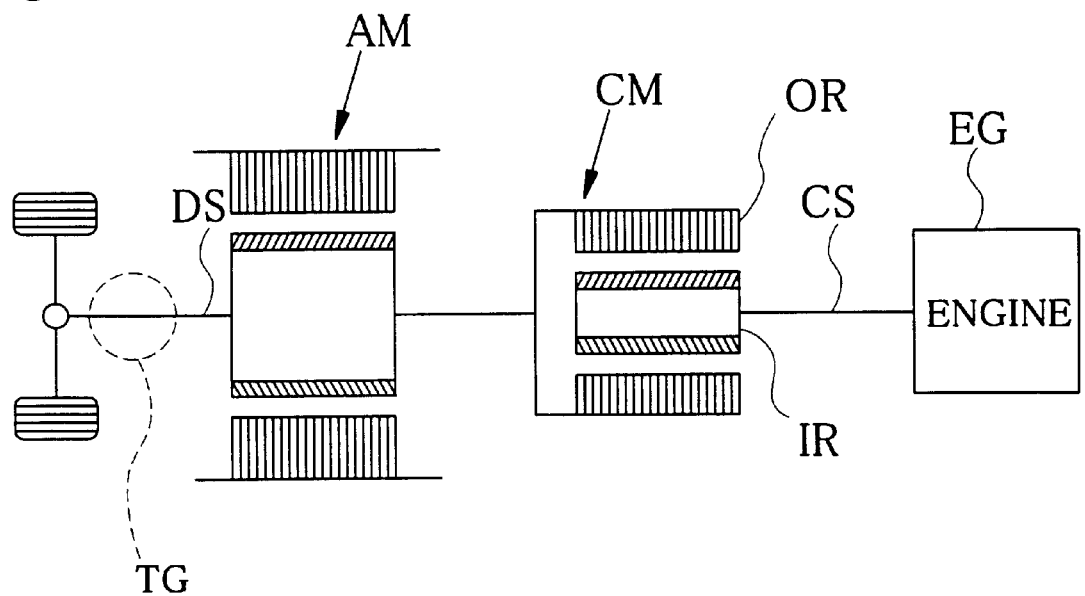
FIG. 30 schematically illustrates the structure of a hybrid vehicle having a motor linked with a drive shaft.
Figure 33:
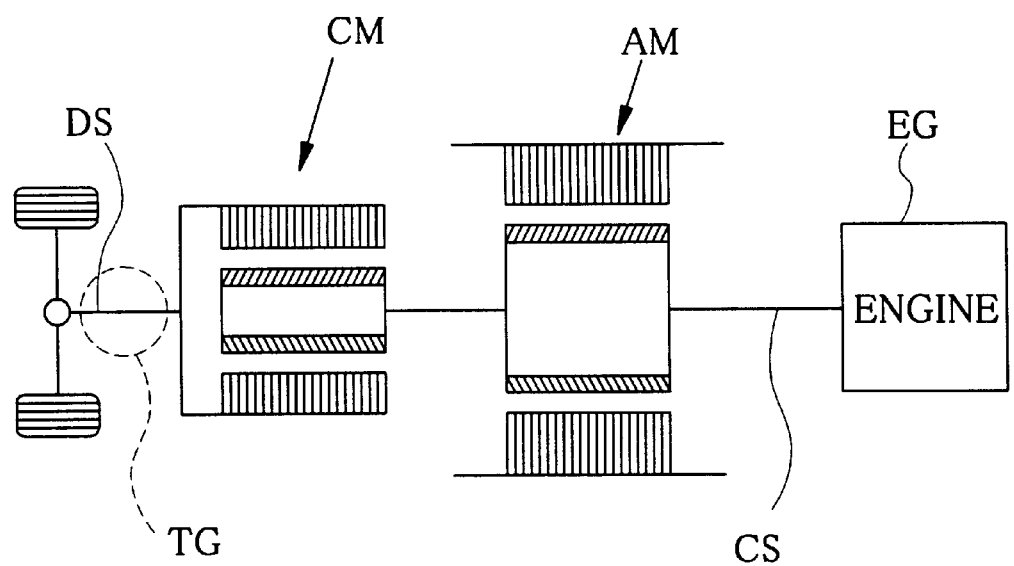
FIG. 33 schematically illustrates the structure of the hybrid vehicle having the motor linked with the output shaft of the engine.
Figure 31:
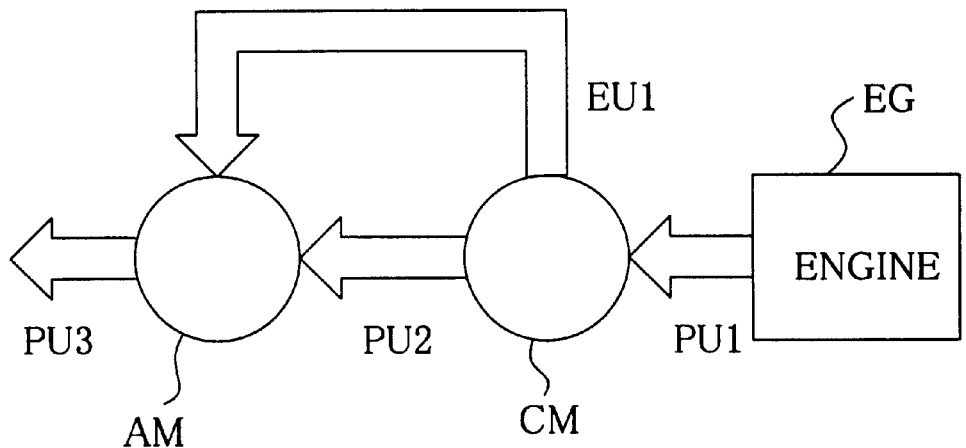
FIG. 31 shows power transmission in the case of underdrive connection when the revolving speed of the engine is higher than that of the drive shaft in the structure of FIG. 30.
Figure 32:
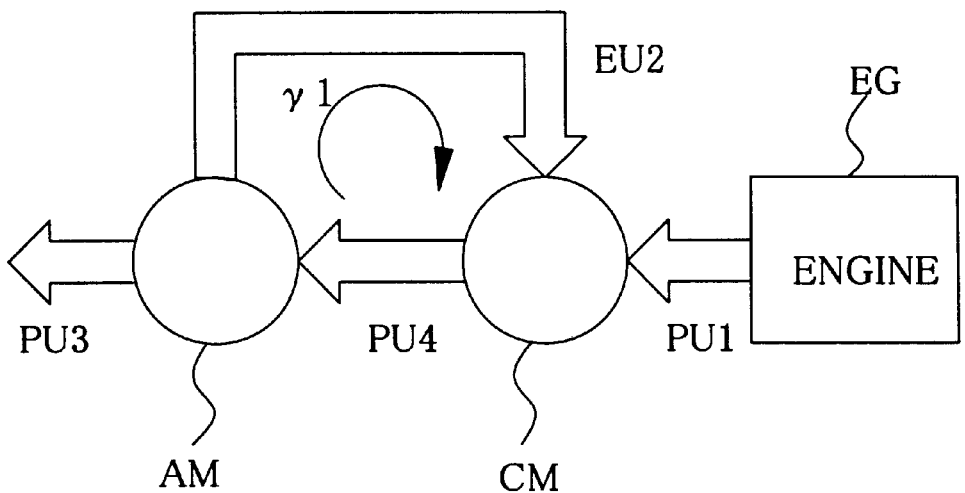
FIG. 32 shows power transmission in the case of underdrive connection when the revolving speed of the engine is lower than that of the drive shaft in the structure of FIG. 30.
Figure 34:
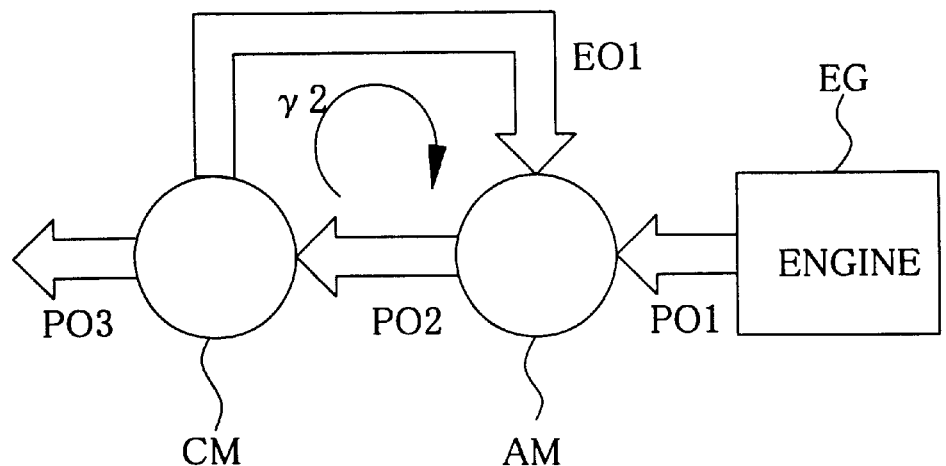
FIG. 34 shows power transmission in the case of overdrive connection when the revolving speed of the engine is higher than that of the drive shaft in the structure of FIG. 33.
Figure 35:
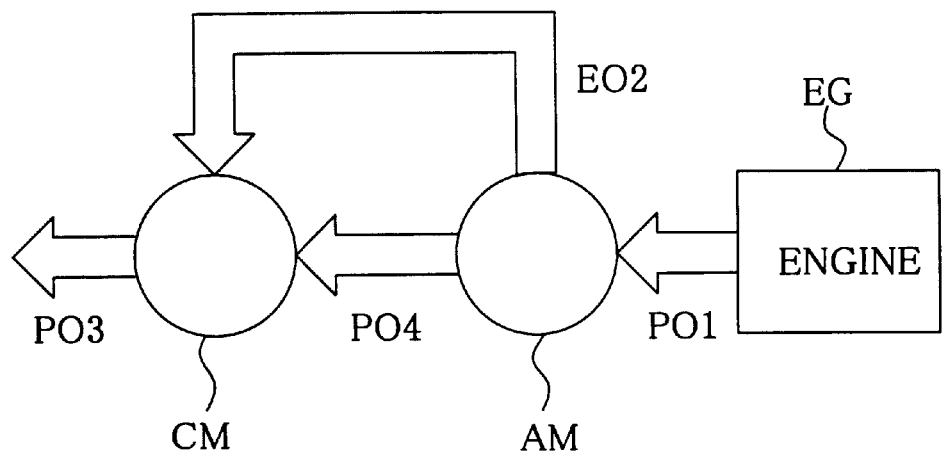
FIG. 35 shows power transmission in the case of overdrive connection when the revolving speed of the engine is lower than that of the drive shaft in the structure of FIG. 33.
Figure 36:
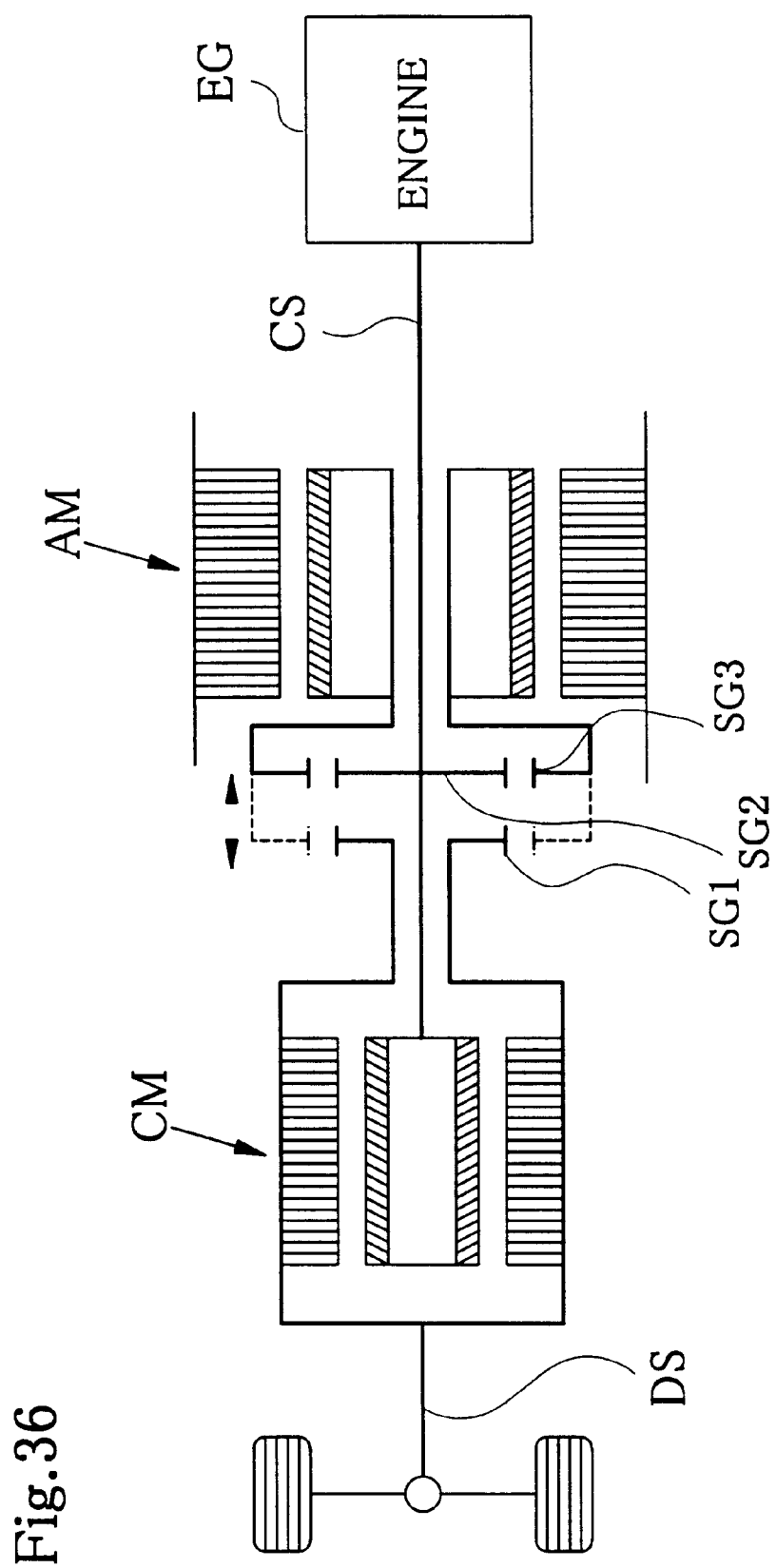
FIG. 36 illustrates the structure of a hybrid vehicle in which the connection of the assist motor is changeable.

In the connecting state B, the inner clutch is in OFF position and the outer clutch is in ON position; that is, electricity is supplied only to the coil 601. Since only the outer clutch gains coupling, the connecting state B is equivalent to the configuration in which the assist motor 140 is linked with the outer rotor 134 of the clutch motor 130. This is identical with the structure of FIG. 30 discussed previously. This connecting state is hereinafter referred to as the underdrive connection In the connecting state C, the inner clutch is in ON position and the outer clutch is in OFF position; that is, electricity is supplied only to the coil 603. Since only the inner clutch gains coupling, the connecting state C is equivalent to the configuration in which the assist motor 140 is linked with the engine 150. This is identical with the structure of FIG. 33 discussed previously. This connecting state is hereinafter referred to as the overdrive connection.

In the connecting state D, both the inner clutch and the outer clutch are in OFF position; that is, no electricity is supplied to either of the coils 601 and 603. Since both the inner clutch and the outer clutch are released, the assist motor 140 is disconnected from both the engine 150 and the clutch motor 130. In this case, the engine 150 is linked with the drive shaft only via the clutch motor 130.

The hybrid vehicle of the embodiment attains the four different connecting states based on the on-off state of the dual clutch 200. Only the connecting state B (the underdrive connection) and the connecting state C (the overdrive connection) are, however, practically effective for the drive of the hybrid vehicle as described above. The technique of the embodiment thus selectively uses the connecting states B and C according to the driving conditions of the vehicle, among the four possible connecting states A through D.

The driving conditions of the hybrid vehicle of this embodiment including the selective use of the connecting states discussed above are controlled by the main control unit 190. Like the EFIECU 170, the main control unit 190 is a one-chip microcomputer including a CPU, a ROM, and a RAM. The CPU carries out a variety of control processes discussed later according to programs recorded in the ROM. In order to attain such control processes, a diversity of sensors and switches are electrically connected to the main control unit 190. Some examples of the sensors and switches connecting with the main control unit 190 include an accelerator pedal position sensor 165 that measures the step-on amount of an accelerator pedal, a speed sensor 117 that measures the revolving speed of the axle 116, and a speed sensor 145 that measures the revolving speed of the assist motor 140 (see FIG. 1). The main control unit 190 is electrically connected with the EFIECU 170 and transmits various pieces of information to and from the EFIECU 170 through communications. The main control unit 190 outputs required pieces of information to the EFIECU 170 to indirectly control the engine 150. On the other hand, required pieces of information, such as the revolving speed of the engine 150, are input from the EFIECU 170 to the main control unit 190.

D. Generation Operations

As general operations of the hybrid vehicle of this embodiment, the following describes the operations of converting the power output from the engine 150 into a required combination of the revolving speed and the torque and outputting the required combination to the axle 116. For the clarity of explanation, it is assumed here that the differential gear 114 has a gear ratio equal to 1. Namely it is assumed that the revolving speed and the torque of the axle 116 are identical with the revolving speed and the torque of the drive shaft 135.

In the hybrid vehicle of this embodiment, the conversion follows different processes according to the relationship between a revolving speed Ne of the engine 150 and a revolving speed Nd of the axle 116 and the connecting state of the assist motor 140. These processes are described individually.

Figure 11:
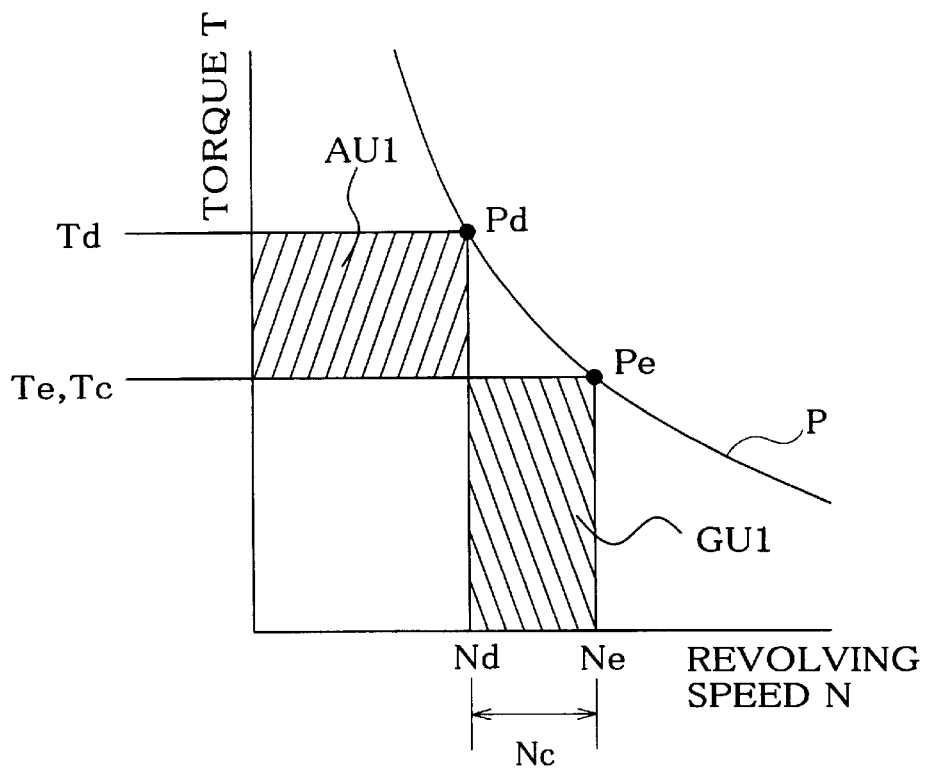
FIG. 11 is a graph showing a process of torque conversion in the state of underdrive connection in the case where the revolving speed Nd of the axle is lower than the revolving speed Ne of the engine.

The conversion is carried out through the following process in the state of the underdrive connection (that is, the connecting state B shown in FIG. 10). FIG. 11 is a graph showing a process of torque conversion in the state of the underdrive connection in the case where the revolving speed Nd of the axle 116 is lower than the revolving speed Ne of the engine 150. The revolving speed N is plotted as abscissa, and the torque T as ordinate. The engine 150 is driven at a driving point Pe, while the axle 116 is rotated at a rotating pint Pd. A curve P shown in the graph of FIG. 11 is a constant-power curve where the product of the revolving speed and the torque is fixed. The power Pe output from the engine 150 and defined by a revolving speed Ne and a torque Te is converted into the power Pd defined by a revolving speed Nd that is lower than the revolving speed Ne and a torque Td that is greater than the torque Te and output to the axle 116.

In the case of the conversion shown in FIG. 11, since the revolving speed Nd of the axle 116 is lower than the revolving speed Ne of the engine 150, the clutch motor 130 relatively rotates in a reverse direction and is driven to transmit part of the power output from the engine 150 to the axle 116, while recovering the residual output power in the form of electric power. The regenerated electric power is equal to the power of the clutch motor 130, that is, equal to an area GU1. The torque Td of the axle 116 is greater than the torque Te of the engine 150. The assist motor 140 is accordingly driven with a positive torque and a positive revolving speed and carries out the power running with a supply of electric power. The supply of electric power is equal to the power output from the assist motor 140, that is, equal to an area AU1.

When it is assumed that both the clutch motor 130 and the assist motor 140 have a driving efficiency of 100%, the electric power regenerated by the clutch motor 130 is identical with the electric power supplied to the assist motor 140. The clutch motor 130 takes out the energy corresponding to the area GU1 in the form of electric power and supplies the electric power as the energy corresponding to the area AU1. This converts the power defined by the driving point Pe of the engine 150 into the state of the point Pd. In the actual state, however, the motors 130 and 140 do not have the driving efficiency of 100%. The above conversion is accordingly implemented by using the electric power accumulated in the battery 194 or by causing the engine 150 to output an additional power corresponding to the loss. For the clarity of explanation, the operations of the embodiment are described on the assumption that both the motors 130 and 140 have the driving efficiency of 100%.

Figure 12:
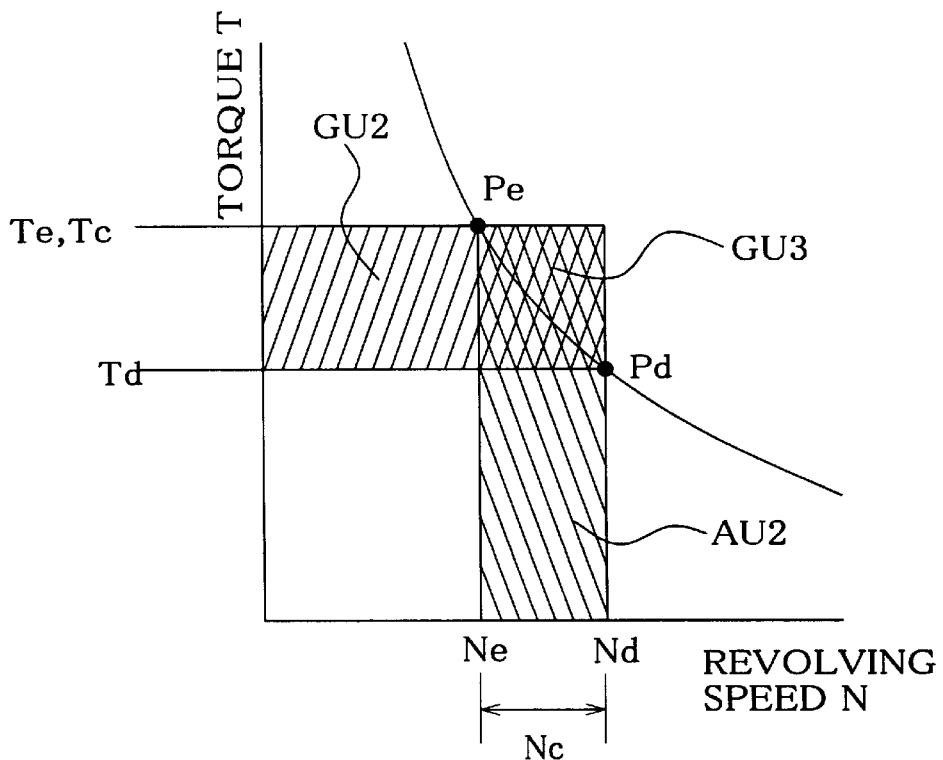
FIG. 12 is a graph showing a process of torque conversion in the state of underdrive connection in the case where the revolving speed Nd of the axle is higher than the revolving speed Ne of the engine.

FIG. 12 is a graph showing a process of torque conversion in the state of the underdrive connection in the case where the revolving speed Nd of the axle 116 is higher than the revolving speed Ne of the engine 150. In the case of the conversion shown in FIG. 12, the clutch motor 130 carries out the power running with a supply of electric power. The supply of electric power is equal to the total of areas GU2 and GU3. The torque Td of the axle 116 is smaller than the torque Te of the engine 150. The assist motor 140 accordingly carries out the regenerative operation. The regenerated electric power is equal to the total of areas AU2 and GU3. When it is assumed that both the motors 130 and 140 have the driving efficiency of 100%, the electric power regenerated by the assist motor 140 is equal to the electric power supplied to the clutch motor 130. The conversion in this state causes the electric power to be supplied from the assist motor 140 located on the downstream side to the clutch motor 130 located on the upstream side, thereby generating a circulation of the power. The area GU3 shown in FIG. 12 corresponds to the circulated power.

In the state of the underdrive connection, the driving points of the assist motor 140 and the clutch motor 130 to implement the above conversions are defined by Equations (1) given below:

Revolving speed of clutch motor 130 $Nc=Nd-Ne$;

Torque of clutch motor 130 $Tc=Te$;

Revolving speed of assist motor 140 $Na=Nd$;

Torque of assist motor 140 $Ta=Td-Te$;  (1)

Figure 13:
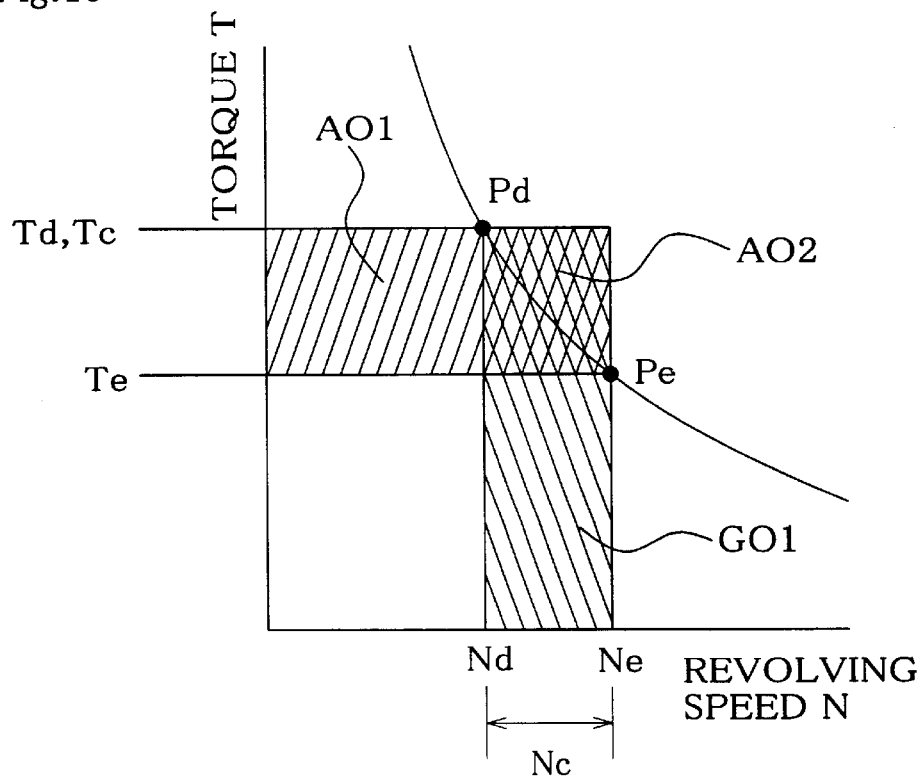
FIG. 13 is a graph showing a process of torque conversion in the state of overdrive connection in the case where the revolving speed Nd of the axle is lower than the revolving speed Ne of the engine.

FIG. 13 is a graph showing a process of torque conversion in the state of the overdrive connection in the case where the revolving speed Nd of the axle 116 is lower than the revolving speed Ne of the engine 150. In the case of the conversion shown in FIG. 13, the torque Td of the axle 116 is greater than the torque Te of the engine 150. The assist motor 140 accordingly carries out the power running with a supply of electric power, which is equal to the total of areas AO1 and AO2. The revolving speed Nd of the axle 116 is lower than the revolving speed Ne of the engine 150. The clutch motor 130 accordingly carries out the regenerative operation. The regenerated electric power is equal to the total of areas AO2 and GO1. The electric power regenerated by the clutch motor 130 is supplied to the assist motor 140 for the power running. The regenerated electric power is equal to the supplied electric power. The conversion in this state causes the electric power to be supplied from the clutch motor 130 located on the downstream side to the assist motor 140 located on the upstream side, thereby generating a circulation of the power. The area AO2 shown in FIG. 13 corresponds to the circulated power.

Figure 14:
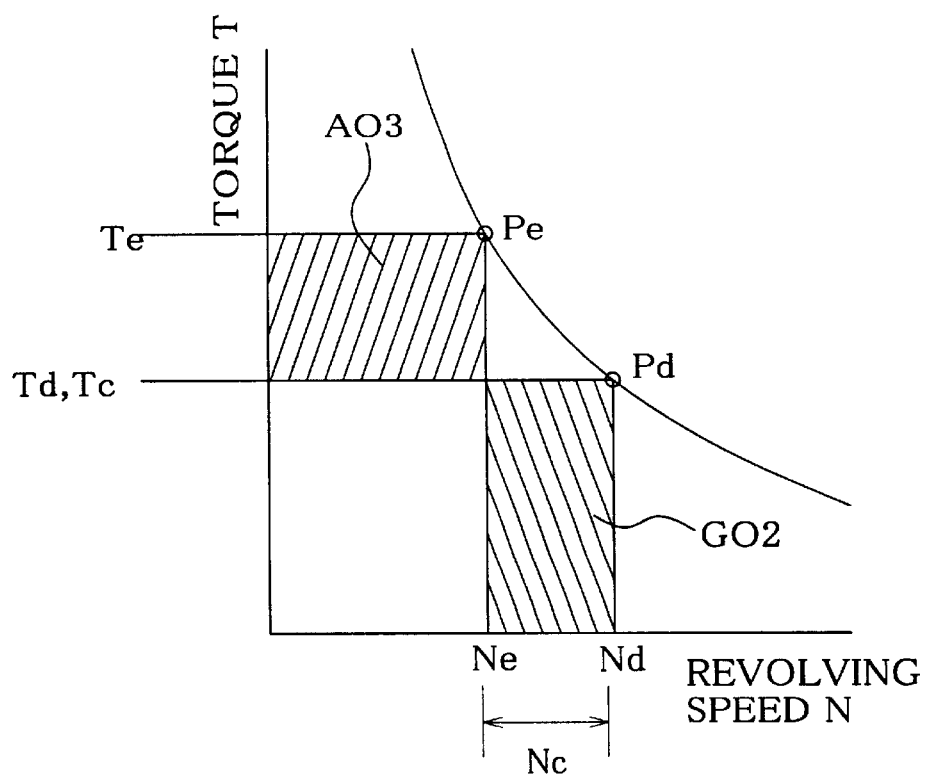
FIG. 14 is a graph showing a process of torque conversion in the state of overdrive connection in the case where the revolving speed Nd of the axle is higher than the revolving speed Ne of the engine.

FIG. 14 is a graph showing a process of torque conversion in the state of the overdrive connection in the case where the revolving speed Nd of the axle 116 is higher than the revolving speed Ne of the engine 150. In the case of the conversion shown in FIG. 14, the torque Td of the axle 116 is smaller than the torque Te of the engine 150. The assist motor 140 accordingly carries out the regenerative operation to recover an electric power, which is equal to an area AO3. The revolving speed Nd of the axle 116 is higher than the revolving speed Ne of the engine 150. The clutch motor 130 accordingly carries out the power running with a supply of electric power, which is equal to an area GO2. The regenerated electric power is equal to the supplied electric power. The conversion in this state causes the electric power to be supplied from the assist motor 140 located on the upstream side to the clutch motor 130 located on the downstream side, thereby generating no circulation of the power.

In the state of the overdrive connection, the driving points of the assist motor 140 and the clutch motor 130 to implement the above conversions are defined by Equations (2) given below:

Revolving speed of clutch motor 130 $Nc=Nd-Ne$;

Torque of clutch motor 130 $Tc=Td$;

Revolving speed of assist motor 140 $Na=Ne$;

Torque of assist motor 140 $Ta=Td-Te$;  (2)

As described above, the hybrid vehicle of this embodiment converts the power output from the engine 150 into the required power defined by the required revolving speed and the required torque according to the connecting state of the assist motor 140 and the relationship between the revolving speed Nd of the axle 116 and the revolving speed Ne of the engine 150, thereby causing the required power to be output from the axle 116. This drive mode is hereinafter referred to as the standard drive mode. The hybrid vehicle is also driven with the assist motor 140 as the power source while the engine 150 is at a stop. This drive mode is hereinafter referred to as the EV drive mode. The EV drive is carried out in the state of the underdrive connection. While the hybrid vehicle stops, the assist motor 140 may carry out the regenerative operation with the power of the engine 150 to generate the electric power. Such power generation is carried out in the state of the overdrive connection.

As described above with FIGS. 11 through 14, it is desirable that the hybrid vehicle adopts the overdrive connection when the revolving speed Nd of the axle 116 is higher than the revolving speed Ne of the engine 150 and the underdrive connection when the revolving speed Nd is lower than the revolving speed Ne. This arrangement effectively prevents the circulation of the power and thus improves the driving efficiency. In order to attain the improved driving efficiency, the hybrid vehicle of the embodiment controls the connecting state of the assist motor 140 according to the relationship between the revolving speed Nd and Ne.

Figure 15:
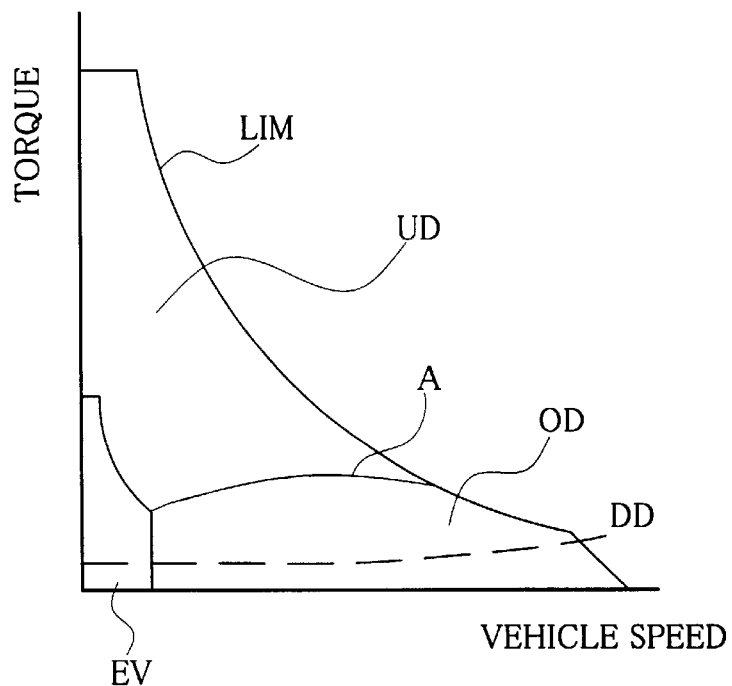
FIG. 15 shows the selection of various drive modes in the hybrid vehicle of this embodiment.

FIG. 15 shows the selection of various drive modes in the hybrid vehicle of this embodiment. A curve LIM represents a drivable area of the hybrid vehicle. In an area with relatively low vehicle speeds and small torques, the EV drive is carried out. In an area with vehicle speeds and torques of not less than preset levels, the standard drive is carried out. A curve A represents a boundary on which the revolving speed Ne of the engine 150 is equal to the revolving speed Nd of the axle 116. In the area with smaller torques than the curve A, the hybrid vehicle is driven in principle in the state of the overdrive connection (OD). In the area with greater torques than the curve A, on the contrary, the hybrid vehicle is driven either in the state of the underdrive connection (UD) or in the neutral state. For example, when the driving conditions of the vehicle vary along a curve DD shown in FIG. 15, the hybrid vehicle first carries out the EV drive and then shifts to the standard drive in the state of the overdrive connection.

As clearly shown in the map of FIG. 15, the underdrive connection is used in the area with the requirement of relatively large torques. The hybrid vehicle of the embodiment thus changes the connecting state to the underdrive connection at the time of acceleration, for example, in response to an abrupt step-on of the accelerator pedal, simultaneously with the control procedure based on the driving efficiency discussed above. This arrangement ensures the high response and the smooth acceleration. The control procedure of changing the connecting state of the assist motor 140 will be described later in detail.

E. Drive Control Process

As described above, the hybrid vehicle of the embodiment is driven in a diversity of drive modes including the EV drive mode and the standard drive mode. The CPU incorporated in the main control unit 190 (hereinafter simply referred to as the CPU) specifies the drive mode according to the driving conditions of the vehicle and controls the engine 150, the clutch motor 130, and the assist motor 140 in the specified drive mode. These controls are performed by periodically executing a variety of control process routines. The following describes the details of a torque control process in the standard drive mode.

Figure 16:
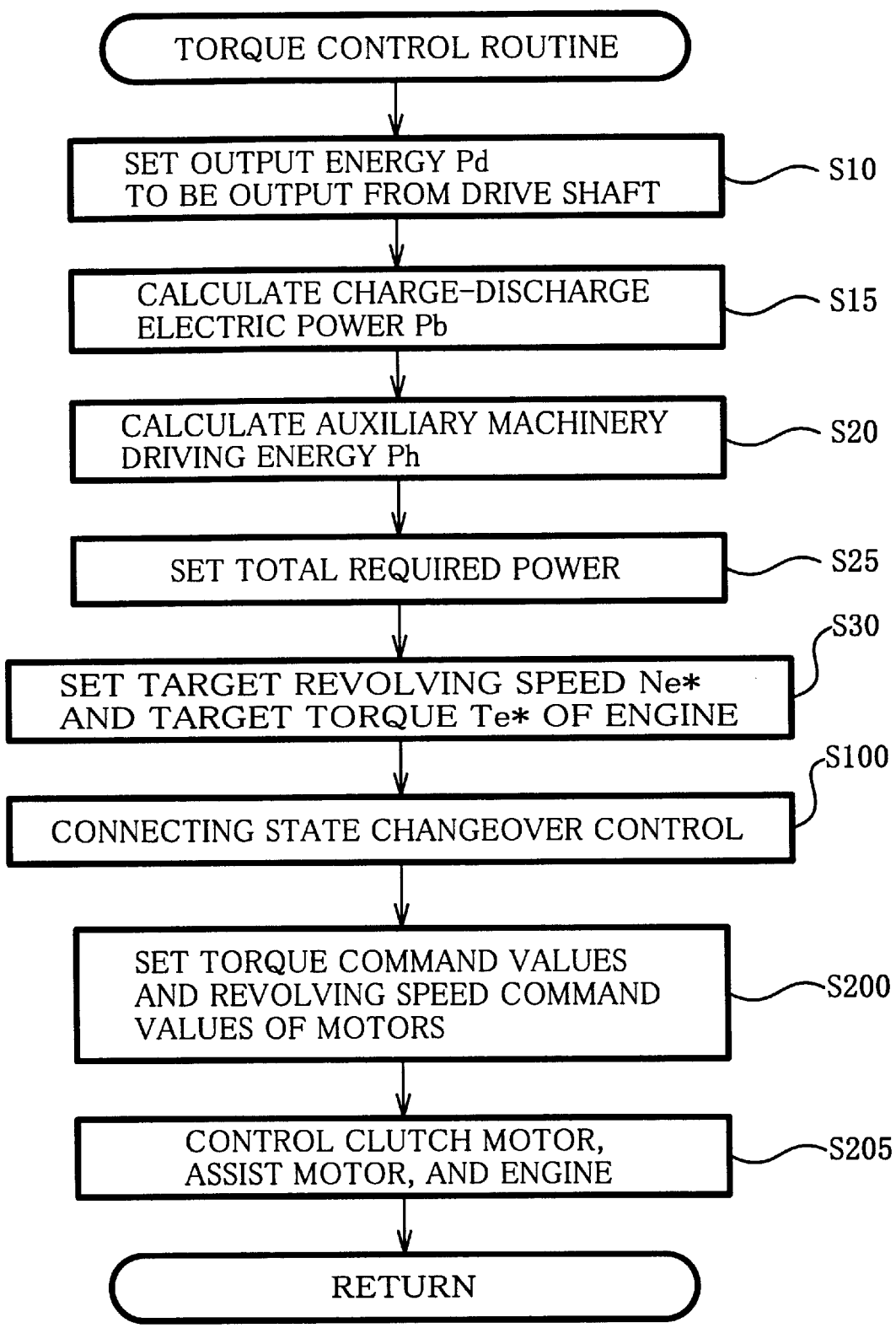
FIG. 16 is a flowchart showing a torque control routine in the standard drive mode.

FIG. 16 is a flowchart showing a torque control routine in the standard drive mode. When the program enters this routine, the CPU first sets the energy Pd to be output from the drive shaft 135 at step S10. The energy or the power Pd is set, based on the vehicle speed and the step-on amount of the accelerator pedal measured by the accelerator pedal position sensor 165. The energy Pd to be output from the drive shaft 135 is defined by the product of a target revolving speed Nd* and a target torque Td* of the axle 116. The target torque Td* is read from a table representing the mappings of the accelerator travel and the vehicle speed to the torque.

The CPU subsequently calculates a charge-discharge electric power Pb and an auxiliary machinery driving energy Ph at steps S15 and S20. The charge-discharge electric power Pb represents the energy required for charging or discharging the battery 194. The charge-discharge electric power Pb takes a positive value when it is required to charge the battery 194, and takes a negative value when it is required to discharge the battery 194. The auxiliary machinery driving energy Ph represents the electric power required for driving auxiliary machinery including an air conditioner. The sum of the calculated electric powers or energies Pd, Pb, and Ph is set as a required power Pe at step S25.

The torque control routine carries out the control of the engine 150 and the other related constituents by taking into account the energy balance per unit time. The term 'energy' in this specification thus represents the energy per unit time. From this point of view, the mechanical energy is synonymous with the power, and the electrical energy is synonymous with the electric power in this specification.

The CPU then sets a driving point of the engine 150, based on the preset required power Pe at step S30. The driving point is defined by a combination of a target revolving speed Ne* and a target torque Te* of the engine 150. The driving point of the engine 150 is set according to a predetermined map by basically giving preference to the driving efficiency of the engine 150.

Figure 17:
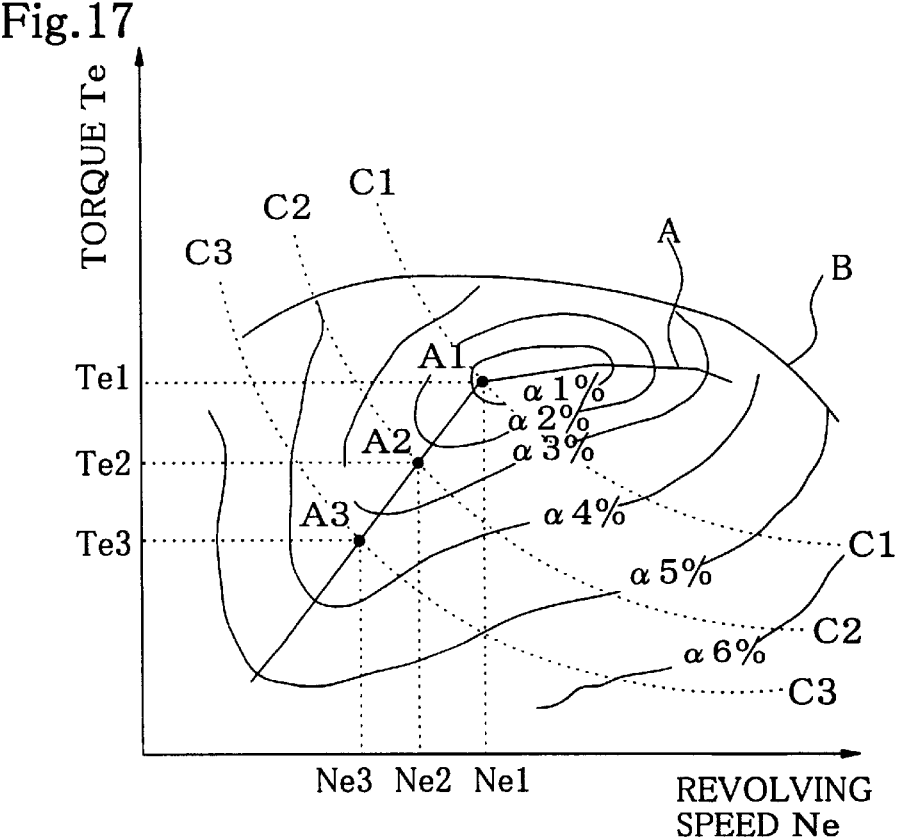
FIG. 17 is a graph showing the relationship between the driving point of the engine and the driving efficiency.

FIG. 17 is a graph showing the relationship between the driving point of the engine 150 and the driving efficiency. In the graph of FIG. 17, the driving conditions of the engine 150 are defined by the revolving speed Ne plotted as abscissa and the torque Te plotted as ordinate. A curve B represents a limit of the operable range of the engine 150. Curves al through Q6 represent constant driving efficiency curves on which the driving efficiency of the engine 150 is fixed. The driving efficiency lowers from the curve al to the curve α6. Curves C1 through C3 represent constant power curves on which the power (revolving speed×torque) output from the engine 150 is fixed.

As clearly understood from the graph of FIG. 17, the driving efficiency of the engine 150 significantly varies according to the revolving speed and the torque. When the engine 150 outputs the power along the curve C1, a driving point A1 (defined by the combination of the revolving speed and the torque) has the maximum driving efficiency. In a similar manner, when the engine 150 outputs the power along the curves C2 and C3, driving points A2 and A3 have the maximum driving efficiency. Selecting the driving point having the maximum driving efficiency corresponding to the power to be output gives a curve A. The curve A is called a working curve. The working curve A is identical with the curve A shown in FIG. 15.

The concrete procedure of step S30 in the flowchart of FIG. 16 reads the driving point corresponding to the required power Pe from a map, which represents the working curve A experimentally determined in advance and stored in the ROM incorporated in the main control unit 190, and sets the target revolving speed Ne* and the target torque Te* of the engine 150. This technique enables the setting of a desired driving point of the engine 150 having a high driving efficiency.

At subsequent step S100, the CPU carries out a connecting state changeover control according to the driving point of the engine 150 set in the above manner. The connecting state changeover control changes the connecting state between the underdrive connection (the connecting state B shown in FIG. 10) and the overdrive connection (the connecting state C shown in FIG. 10) according to the driving conditions of the hybrid vehicle. The details of this control process will be described later in detail. Execution of this control process causes the assist motor 140 to falls into either the underdrive connection or the overdrive connection.

The CPU then sets torque command values and revolving speed command values of the clutch motor 130 and the assist motor 140 at step S200. In the state of the underdrive connection, in order to implement such settings, the procedure substitutes the target revolving speed Nd* and the target torque Td* into the revolving speed Nd and the torque Td of the axle 116 and the target revolving speed Ne* and the target torque Te* set at step S30 into the revolving speed Ne and the torque Te of the engine 150 in Equations (1) given above. In the state of the overdrive connection, the procedure carries out the similar substitution in Equations (2) given above in order to implement the settings.

At subsequent step S205, the CPU controls the operations of the clutch motor 130, the assist motor 140, and the engine 150, based on the torque command values and the revolving speed command values set in the above manner. A known control technique of synchronous motors is applicable to control the operations of these motors. The technique of the embodiment carries out a proportional-plus-integral control, which measures the current torque of each motor and sets the voltage command values to be applied to the respective phases, based on a deviation of the observed torque from the target torque and the target revolving speed. The voltage command values to be applied to the respective phases are specified by the proportional term, the integral term, and the cumulative term of the deviation. Appropriate values, for example, determined experimentally, are set to the proportional coefficients of the respective terms. The voltages set in this manner are converted into the switching duties of the transistor inverters of the driving circuits 191 and 192 and applied to the respective motors through the PWM control.

The CPU regulates the switching operations of the driving circuits 191 and 192 to directly control the operations of the clutch motor 130 and the assist motor 140 as described above. The operations of the engine 150 are, on the other hand, actually controlled by the EFIECU 170. The CPU of the main control unit 190 outputs the information with regard to the driving point of the engine 150 to the EFIECU 170, thereby indirectly controlling the operations of the engine 150. The above series of the processing is carried out periodically, so that the hybrid vehicle of the embodiment converts the power output from the engine 150 into a desired combination of the revolving speed and the torque and causes the desired combination to be output from the drive shaft 135 for a drive.

F. Connecting State Changeover Control

Figure 18:
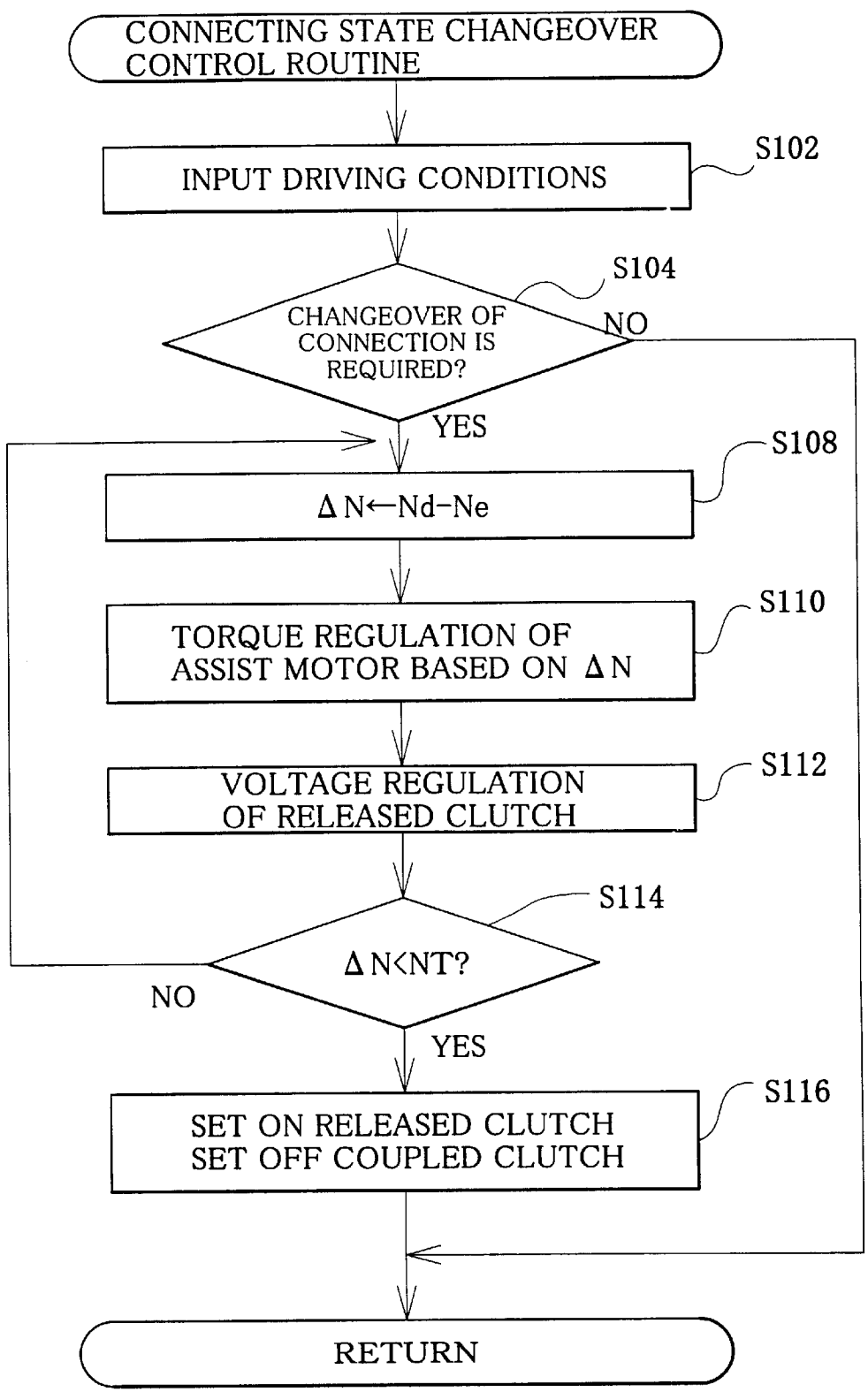
FIG. 18 is a flowchart showing a connecting state changeover control routine.

FIG. 18 is a flowchart showing a connecting state changeover control routine. When the program enters this routine, the CPU first inputs parameters representing the driving conditions of the hybrid vehicle at step S102. The parameters input here include the target revolving speed Nd* and the target torque Td* of the axle 116 and the accelerator travel. The CPU then determines whether or not the changeover of the connecting state is required, based on the input parameters at step S104. The requirement of the changeover of the connecting state is based on two conditions. The first condition is whether or not the changeover of the connection heightens the driving efficiency. The second condition is whether or not the changeover of the connection enables a required torque by the driver to be output immediately and ensure the smooth acceleration.

Figure 19:
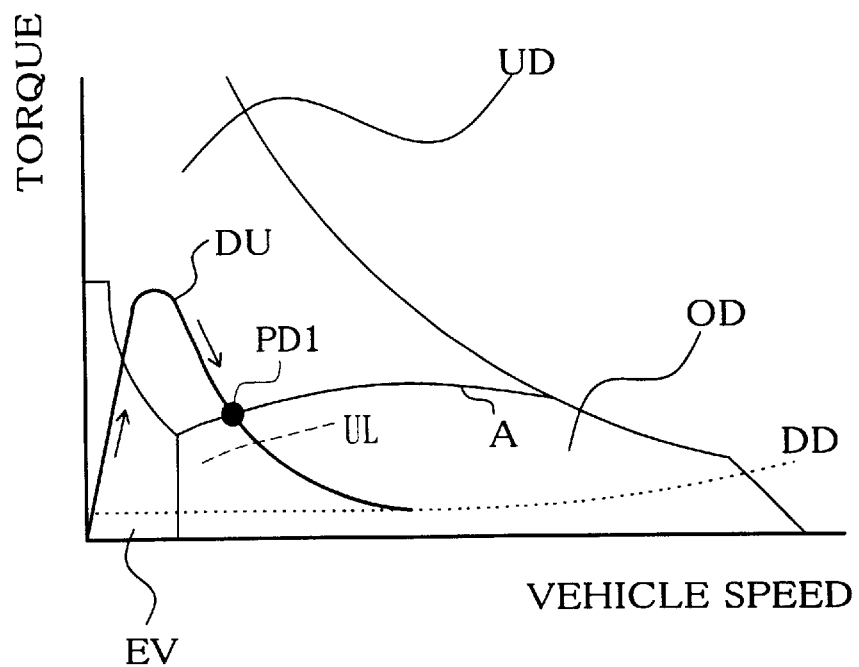
FIG. 19 shows the requirement of the changeover from the underdrive connection to the overdrive connection.

The first condition, that is, the determination based on the driving efficiency, is described in a concrete example. FIG. 19 shows the requirement of the changeover from the underdrive connection to the overdrive connection. A curve A shown in FIG. 19 corresponds to the curve A shown in FIG. 15 and represents a boundary between a drive area UD suitable for the underdrive connection and a drive area OD suitable for the overdrive connection. A curve DU represents a variation in vehicle speed and torque during a drive of the hybrid vehicle. As shown by the arrows in FIG. 19, the hybrid vehicle is accelerated with a greater output torque than a drive resistance DD. The output torque gradually lowers with acceleration, and the hybrid vehicle drives at a cruising speed where the output torque balances with the drive resistance DD. The changeover from the underdrive connection to the overdrive connection is carried out, for example, in the course of such acceleration. When the rotating state of the axle 116 varies with a variation in vehicle speed as shown by the arrows to reach a point PD1, at which the curve DU crosses the curve A, the CPU determines that the changeover from the underdrive connection to the overdrive connection is required.

Figure 20:
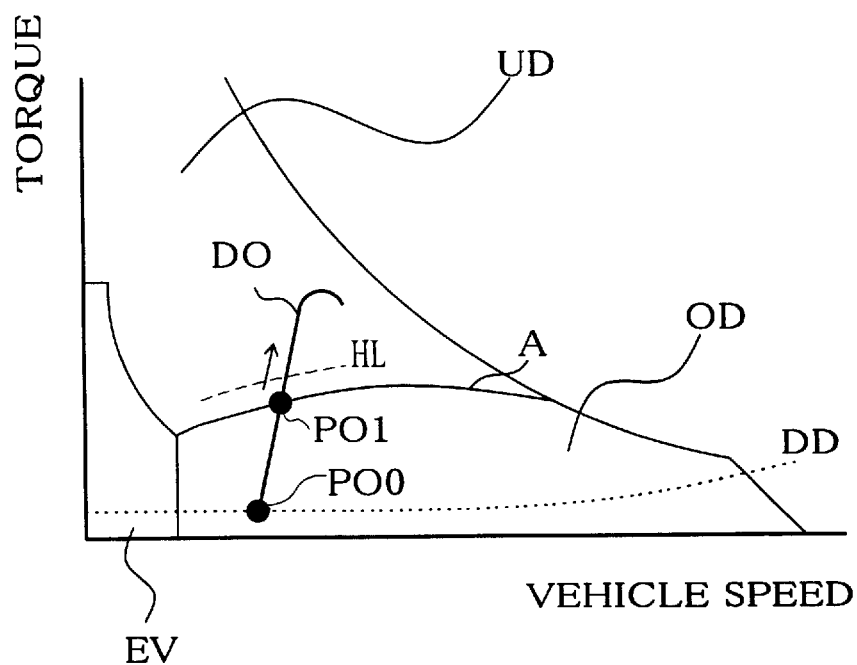
FIG. 20 shows the requirement of the changeover from the overdrive connection to the underdrive connection.

FIG. 20 shows the requirement of the changeover from the overdrive connection to the underdrive connection. A curve DD represents the drive resistance when the hybrid vehicle drives at a cruising speed on a road without any slopes. A point PO0 represents a state of stationary drive at a certain vehicle speed. When the driver steps on the accelerator pedal during a drive in this state, the output torque of the vehicle increases along a curve DO to accelerate the vehicle. The changeover from the overdrive connection to the underdrive connection is carried out, for example, in the course of such acceleration. When the rotating state of the axle 116 varies with a variation in vehicle speed as shown by the arrow to reach a point PO1, at which the curve DO crosses the curve A, the CPU determines that the changeover from the overdrive connection to the underdrive connection is required.

The CPU determines the requirement of the changeover of the connecting state, based on the combination of the vehicle speed and the torque crossing over the working curve. In the technique of the embodiment, a certain hysteresis is set for the determination of the requirement of the changeover, in order to prevent frequent changeovers of the connecting state. The requirement of the changeover from the underdrive connection to the overdrive connection is determined when the rotating state of the axle 116 crosses over the curve A and reaches a predetermined boundary curve UL set in the area OD as shown in FIG. 19. In a similar manner, the requirement of the changeover from the overdrive connection to the underdrive connection is determined when the rotating state of the axle 116 crosses over the curve A and reaches a predetermined boundary curve HL set in the area UD as shown in FIG. 20. The width of the hysteresis, that is, the positions of the boundary curves HL and HL, is arbitrarily set by taking into account the driving efficiency of the vehicle and the possible deterioration of the ride due to the frequent changeovers.

The second condition, that is, the determination based on the smooth acceleration, is described in a concrete example. In the state of the overdrive connection as shown in FIG. 20, the driver requires abrupt acceleration, for example, by abruptly stepping on the accelerator pedal. In this case, the driver requires a large torque. There is accordingly a high possibility that the changeover from the overdrive connection to the underdrive connection is required in the course of the acceleration as shown in the map of FIG. 20. The changeover to the underdrive connection at the beginning of the acceleration, that is, at the point PO0 shown in FIG. 20, desirably prevents the changeover control in the course of the acceleration, thereby ensuring the smooth acceleration.

In the hybrid vehicle of the embodiment, the underdrive connection has a greater maximum output torque and is thus suitable for the abrupt acceleration. In the state of the overdrive connection, the engine 150, the assist motor 140, and the clutch motor 130 are arranged in this sequence from the upstream side. The maximum output torque in this structure is restricted to the maximum torque transmittable by the clutch motor 130. In the state of the underdrive connection, on the other hand, the engine 150, the clutch motor 130, and the assist motor 140 are arranged in this sequence from the upstream side. This structure enables the assist motor 140 to apply an additional torque, in addition to the maximum torque transmittable by the clutch motor 130. Because of these reasons, the underdrive connection is suitable for the abrupt acceleration. When the driver abruptly steps on the acceleration pedal, that is, when the variation in accelerator travel becomes equal to or greater than a preset level, the technique of the embodiment inputs an intention of the abrupt acceleration and determines that the changeover to the underdrive connection is required.

When it is determined at step S104 that the changeover of the connecting state is required, the procedure carries out a series of the processing to change the coupling state of the dual clutch 200. When it is determined at step S104 that the changeover of the connecting state is not required, on the other hand, the procedure skips the series of the processing and exits from this connecting state changeover control routine.

The following describes the series of the processing to change the coupling state of the dual clutch 200. In the description below, the clutch changed from the OFF position to the ON position by the series of the processing is called the released clutch, and the clutch changed from the ON position to the OFF position is called the coupled clutch. The changeover from the underdrive connection to the overdrive connection sets on the inner clutch and sets off the outer clutch in the dual clutch 200. Namely the inner clutch is the released clutch and the outer clutch is the coupled clutch. The changeover from the overdrive connection to the underdrive connection, on the other hand, sets on the outer clutch and sets off the inner clutch in the dual clutch 200. Namely the outer clutch is the released clutch and the inner clutch is the coupled clutch.

The changeover procedure makes the revolving speeds of the three shafts of the dual clutch 200 substantially coincident with one another, sets on the released clutch to keep both the inner clutch and the outer clutch in the coupled state, and sets off the coupled clutch. At step S108, the CPU subtracts the revolving speed Ne of the engine 150 from the revolving speed Nd of the drive shaft 135 to calculate a revolving speed difference ΔN as a criterion of determining whether or not the changeover is allowed. The revolving speed difference ΔN corresponds to a difference between the revolving speed of the two rotating shafts in the coupled clutch and the revolving speed of the residual one rotating shaft in the released clutch.

The CPU regulates the torque of the assist motor 140 to reduce the revolving speed difference ΔN at step S110. The technique of the embodiment adopts the proportional-plus-integral control based on the revolving speed difference ΔN. In the state of the overdrive connection, the revolving speed Ne of the engine 150 is lower than the revolving speed Nd of the drive shaft 135, so that the revolving speed difference ΔN is greater than zero. When the connecting state is changed from the overdrive connection to the underdrive connection, it is required to raise the revolving speed Ne of the engine 150 to the revolving speed Nd of the drive shaft 135. The assist motor 140 is linked with the engine 150 and thereby outputs a positive torque in relation to the revolving speed difference ΔN to raise the revolving speed Ne of the engine 150. In the course of the changeover from the underdrive connection to the overdrive connection, on the other hand, the assist motor 140 is linked with the drive shaft 135 and thereby outputs a positive torque in relation to the revolving speed difference ΔN to raise the revolving speed Nd of the drive shaft 135. The positive torque is set by multiplying the proportional term and the integral term of the revolving speed 5 difference ΔN by preset gains. The torque of the assist motor 140 may be set by a variety of other methods.

Regulation of the assist motor 140 makes the revolving speeds of the three shafts connecting with the dual clutch 200 substantially coincident with one another. The technique of the embodiment also carries out a voltage regulation of the released clutch at step S112, in order to quickly equalize the revolving speeds. The voltage regulation causes the released clutch to be coupled when the existing revolving speed difference is within an allowable range of the dual clutch 200. This procedure is described in an example of the changeover from the overdrive connection to the underdrive connection. In the state of the overdrive connection, the revolving speed Nd of the drive shaft 135 is higher than the revolving speed Ne of the engine 150. When the released clutch or the outer clutch is coupled in this state, the power of the drive shaft 135 is transmitted to the engine 150, so as to raise the revolving speed Ne of the engine 150. The processing of step S112 couples the released clutch to attain such effects as described later in detail.

After the execution of the regulation of the assist motor 140 and the regulation of the released clutch, the CPU determines whether or not a changeover operation of the clutches is allowed at step S114. The concrete procedure of step S114 compares the revolving speed difference ΔN with a predetermined value NT. The predetermined value NT defines an allowable range of the revolving speed difference ΔN, in which coupling of the clutch is allowed, and is set individually for the dual clutch 200. In the case where the revolving speed difference ΔN is less than the predetermined value NT, the CPU determines that the revolving speed difference ΔN is within the allowable range and carries out the changeover of the clutches at step S116. The concrete procedure of step S116 sets on the released clutch and sets off the coupled clutch. Setting on the released clutch and setting off the coupled clutch may be implemented simultaneously. The technique of the embodiment, however, first keeps both the clutches in the coupled state and subsequently sets off the coupled clutch. In the case where the revolving speed difference ΔN is not less than the predetermined value NT, on the other hand, the CPU determines that the changeover is not allowed and repeatedly executes the processing of steps S108 through S112 to further reduce the revolving speed difference ΔN. The above series of the processing causes the hybrid vehicle of the embodiment to drive while changing the connecting state of the assist motor 140 according to the driving conditions.

In the control process of FIG. 18, the CPU makes the revolving speeds of all the rotating shafts of the dual clutch 200 substantially coincident with one another while keeping the coupled clutch in the coupled state, and subsequently sets on the released clutch and sets off the coupled clutch (step S116). The changeover process of the connecting state is, however, not restricted to this procedure, but the changeover may be implemented via a state in which both the inner clutch and the outer clutch are set in off position. This modified procedure first sets off the coupled clutch, makes the revolving speeds of the two rotating shafts in the released clutch substantially coincident with each other, and then sets on the released clutch. Another possible modification does not perform the torque regulation of the assist motor 140 (step S110) but carries out only the voltage regulation of the released clutch (step S112).

G. Coupling of Released Clutch

Figure 21:
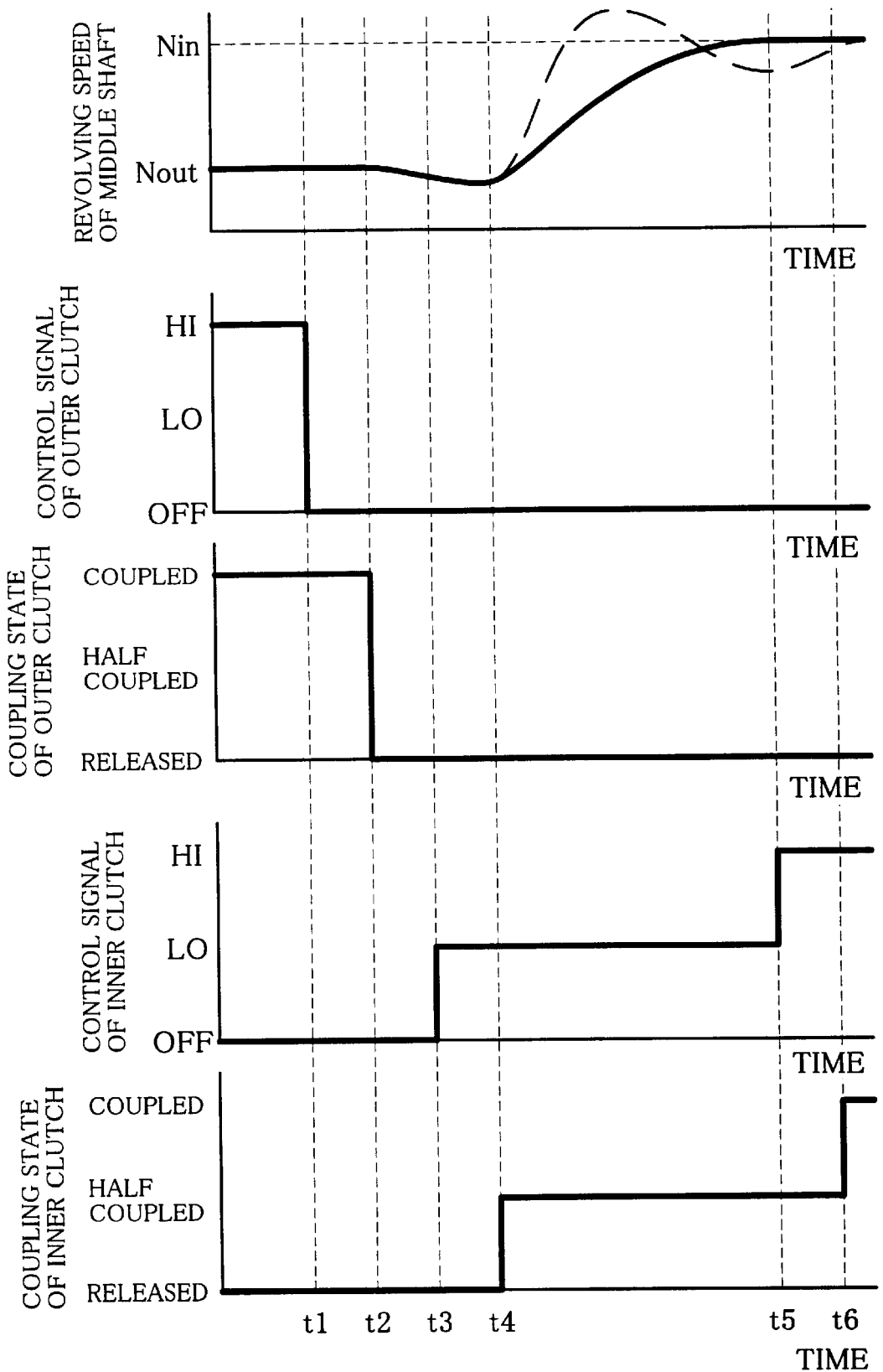
FIG. 21 shows variations in coupling state of the dual clutch and in revolving speed of the middle shaft in the course of a changeover operation.

The following describes the concrete procedure of the regulation carried out at step S112 in the flowchart of FIG. 18. FIG. 21 shows variations in coupling state of the dual clutch 200 and in revolving speed of the middle shaft 401 in the course of a changeover operation. In this example, the connecting state is changed from the underdrive connection to the overdrive connection. Namely the procedure changes the connecting state from the initial state, in which the outer clutch is on, the inner clutch is off, and the middle shaft 401 is coupled with the outer shaft 501 connecting with the drive shaft 135, to the state in which the middle shaft 401 is coupled with the inner shaft 301 connecting with the engine 150. The procedure adopted here releases the coupled clutch or the outer clutch, makes the revolving speeds of the middle shaft 401 and the inner shaft 301 substantially coincident with each other, and sets on the released clutch or the inner clutch. In accordance with one possible modification, the procedure may follow the control process shown in the flowchart of FIG. 18 and carry out the adjustment of the revolving speeds while the outer clutch is kept in the coupled state.

At a time point t1, the CPU outputs a control signal of setting off the outer clutch and starts the changeover operation. At a time point t2 after elapse of a predetermined delay time, the outer clutch is actually released. At this moment, the revolving speed of the middle shaft 401 is equal to a revolving speed Nout of the drive shaft 135.

A low signal is output to the inner clutch at a time point t3 after a certain time delay, and the inner clutch falls into a half coupled state at a time point t4. In the half coupled state, the clutch enables transmission of the torque by means of only the frictional force of the armature 307 against the radially-extending side face 410 of the middle shaft 401. As described previously, the rollers 304 attached to the inner shaft 301 couple with the middle shaft 401, so that the dual clutch 200 of the embodiment transmits the torque. The rollers 304 are generally kept in the neutral position by means of the switch spring 303 and shift to the coupling position when the armature 307 comes into contact with the radially-extending side face 410 to generate a sufficient frictional force against the pressing force of the switch spring 303. Even when the rollers 304 are not shifted to the coupling position, the contact of the armature 307 with the radially-extending side face 410 generates a frictional force to allow transmission of the torque in a certain range between the middle shaft 401 and the inner shaft 301. The half coupled state represents such a state that allows transmission of the torque by means of the frictional force, and is attained by applying a low voltage to the coil 603 of the inner clutch to attract the armature 307 with a small force. The magnitude of the torque transmitted in the half coupled state is naturally smaller than the torque transmitted in the fully coupled state of the rollers 304.

While the inner clutch is in the half coupled state, the inner shaft 301 is coupled with the middle shaft 401 via a slip, so that the revolving speed of the middle shaft 401 rises to a revolving speed Nin of the inner shaft 301. At a time point t5 when the revolving speed of the middle shaft 401 becomes substantially coincident with the revolving speed of the inner shaft 301, a high signal is output to the inner clutch to apply a high voltage to the coil 603 and attract the armature 307 with a strong force. The rollers 304 then shift to the coupling position at a time point t6. This completes the changeover process.

In the time chart of FIG. 21, a curve of the broken line represents a variation in revolving speed of the middle shaft 401 in the structure that does not enable the released clutch to fall into the half coupled state. In this case, it is required to raise the revolving speed of the middle shaft 401 only by the regulation of the assist motor 140. Such regulation often causes overshoots or undershoots in the course of a transient response and requires a longer time to make the revolving speed of the middle shaft 401 substantially coincident with the revolving speed Nin of the inner shaft 301. In the structure that enables the released clutch to fall into the half coupled state, on the other hand, the revolving speed of the middle shaft 401 is increased with rotations of the inner shaft 301 to be coincident with the revolving speed Nin without any overshooting. This ensures the quick changeover. The above example regards the case in which the inner clutch is the released clutch. A similar procedure is adopted when the outer clutch is the released clutch.

In the course of controlling the released clutch according to the procedure of FIG. 21, the coupling force in the half coupled state is set according to a target time required for completion the changeover. The procedure first sets the target time required for completion of the changeover (for example, the time period between the time point t1 and the time point t6 in the time chart of FIG. 21), based on a requirement of the driver's feeling. The procedure then sets a target time required for equalizing the revolving speeds in the released clutch by setting the released clutch in the half coupled state (for example, the time period between the time point t4 and the time point t5 in the time chart of FIG. 21). The target time required for equalizing the revolving speeds in the released clutch is expressed by $\Delta t$ (sec). In the course of the changeover operation of the clutches, the difference between the revolving speed of the coupled clutch and the revolving speed of the released clutch (that is, the difference between the revolving speeds Nin and Nout in FIG. 21) in the initial state varies with a variation in driving conditions. The target time $\Delta t$ is set for a typical initial revolving speed difference $\Delta N$ (rad/sec).

A torque T (Nm) to be applied to the middle shaft 401 in the half coupled state to make the revolving speed difference $\Delta N$ converge to zero in the target time $\Delta t$ is generally given by the following equation:

$$T = I \times \Delta N / \Delta t;$$

where I denotes the moment of inertia (kg·m$^2$) of the middle shaft 401 and the assist motor 140 connected thereto. The torque T applied to the middle shaft 401 is proportional to the polar moment of inertia of area, the coefficient of friction, and the attraction of the armature in the released clutch. Division of the calculated torque T following the above equation by the polar moment of inertia of area and the coefficient of friction of the armature in the released clutch sets the target attraction and the target voltage to be applied to the coil of the inner clutch.

When the calculated torque T exceeds the torque of the switch spring in the released clutch and is sufficiently large to enable coupling of the rollers, the clutch falls into the fully coupled state. In order to avoid the full coupling, the switch spring in the released clutch is designed to apply a greater torque than the calculated torque T. In the state of outputting a high signal to the coil of the released clutch, a greater torque than the torque of the switch spring should act on the frictional coupling member. The target voltage to be applied to the coil of the released clutch is set to enable application of such a torque.

The target time $\Delta t$ required for completion of the changeover and the typical revolving speed difference $\Delta N$ are set individually for the changeover from the overdrive connection to the underdrive connection and for the reversed changeover. The individual settings enable adequate values suitable for the changeover process to be applied for the torques of the switch springs in the outer clutch and the inner clutch and the voltage in the half coupled state.

As described above, the arrangement of coupling the released clutch through the half coupled state enables the revolving speeds of the rotating shafts in the released clutch to become coincident with each other quickly and thereby shortens the time period required for completion of the changeover.

Figure 22:
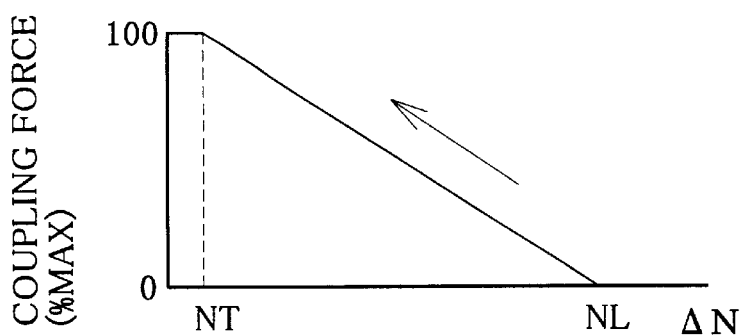
FIG. 22 is a graph showing a voltage regulation process in a first application.

The released clutch may be coupled in a variety of other applications. FIG. 22 is a graph showing a voltage regulation process in a first application. The first application gradually increases the voltage of the coil in the released clutch according to the revolving speed difference, so as to gradually enhance the coupling force. As discussed in FIG. 21, in the released clutch, the torques are applied to make the revolving speeds of the two rotating shafts substantially coincident with each other while there is a slip in the frictional coupling member. The revolving speed difference between the two rotating shafts decreases with elapse of time, so as to enhance the coupling force and equalize the revolving speeds of the two rotating shaft more quickly. In the application of FIG. 22, the coupling force is enhanced with a decrease in revolving speed difference $\Delta N$ in the range of not greater than an upper limit NL of the revolving speed difference $\Delta N$ that allows coupling in the half coupled state. When the revolving speed difference $\Delta N$ is less than the predetermined value NT, the clutch is fully coupled. In the application of FIG. 22, the coupling force is varied linearly. The coupling force may, however, be varied non-linearly or in a stepwise manner.

Figure 23:
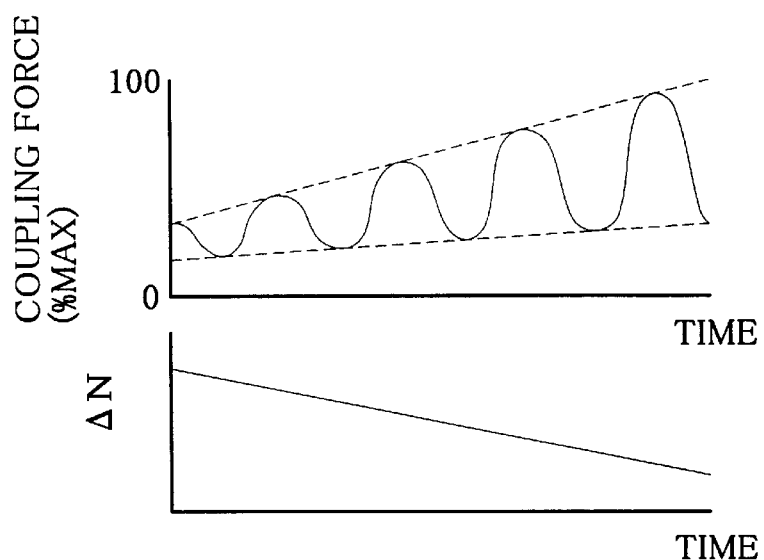
FIG. 23 is a graph showing a voltage regulation process in a second application.

FIG. 23 is a graph showing a voltage regulation process in a second application. The voltage applied to the coil may be varied in a fluctuating manner. A voltage is applied to the coil to couple the clutch under the condition that there is a revolving speed difference. In this case, an impact torque due to the revolving speed difference of the two rotating shafts is applied to reduce the revolving speed difference. When the clutch is kept in the coupled state under such conditions, the impact torque may significantly shorten the life of the clutch. The second application thus weakens the voltage applied to the coil immediately after the coupling of the clutch, so as to lower the coupling force. The arrangement of coupling the clutch while varying the coupling force in a fluctuating manner enables the impact torque to be applied intermittently and quickly reduces the revolving speed difference between the two rotating shafts. The period and the intensity of the fluctuation of the coupling force are arbitrarily set according to the allowable range of the clutch and the revolving speed difference. It is desirable to set the period and the intensity of the fluctuation of the coupling force by taking into account the effects of a possible torque shock occurring at the time of the coupling on the ride. In the example of FIG. 23, the peak of the coupling force is heightened with a decrease in revolving speed difference $\Delta N$. One possible modification lengthens the period of the coupling with a decrease in revolving speed difference $\Delta N$. The coupling force may be fluctuated with a variation in observed revolving speed difference $\Delta N$ or may be fluctuated with time according to a predetermined pattern. The coupling force may otherwise be fluctuated at a fixed period, regardless of the revolving speed difference $\Delta N$ and the elapse of time.

Figure 24:
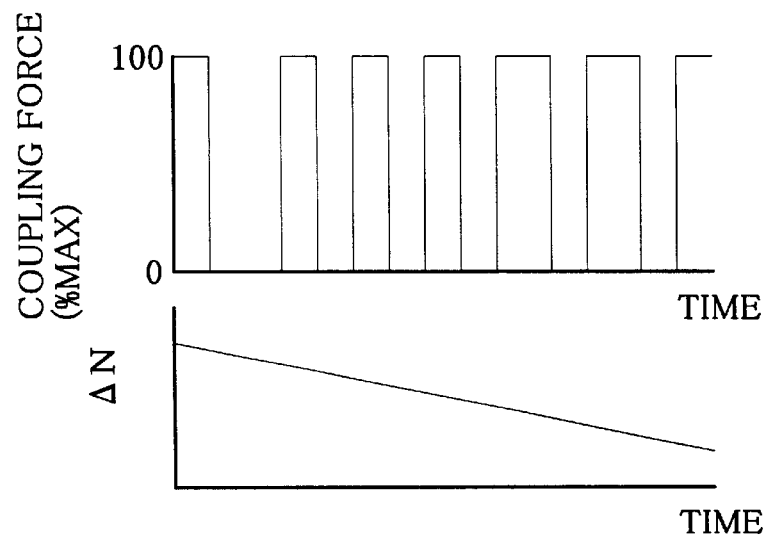
FIG. 24 is a graph showing a voltage regulation process in a third application.

FIG. 24 is a graph showing a voltage regulation process in a third application. The third application intermittently couples the clutch. In the example of FIG. 24, the rollers are intermittently coupled in the fully coupled state. The complete coupling of the rollers causes an extremely strong impact torque, but enables the revolving speeds of the two rotating shafts in the released clutch to become coincident with each other quickly. The intermittent coupling ensures the quick changeover while preventing the life of the released clutch from being undesirably shortened. In the example of FIG. 24, the clutch-coupling time is shortened and the interval between the current coupling and the subsequent coupling is lengthened with a decrease in revolving speed difference $\Delta N$. In this application, the coupling force may further be varied according to the revolving speed difference $\Delta N$.

The processing of step S112 in the changeover control process discussed above regulates the voltage in the released clutch according to a preset application selected among the variety of possible applications as discussed above. In the structure of the embodiment, the supply of electricity to the coils 601 and 603 in the dual clutch 200 is controlled by the on-off operations of the transistors working as the switching elements. The technique of the embodiment thus PWM controls the switch 611 or 613, so as to apply the voltage of the preset application to the coil in the released clutch.

In the embodiment discussed above, the regulation of the released clutch (see step S112 in the flowchart of FIG. 18) is always carried out in the changeover control process. The regulation of the released clutch is executed by shortening the time required for completion of the changeover of the clutches. The regulation of the released clutch may thus be carried out only when shortening the time of the changeover is required. One applicable procedure carries out the regulation of the released clutch only when the driver abruptly steps on the accelerator pedal, and otherwise skips the regulation.

H. Effects

In the hybrid vehicle of the embodiment discussed above, the connection of the assist motor 140 is changed according to the relationship between the revolving speeds of the axle 116 and the engine 150. This arrangement effectively prevents a circulation of the power and enables the hybrid vehicle to be driven with a high driving efficiency. Application of the underdrive connection at the time of acceleration attains the smooth acceleration with a high response.

In the hybrid vehicle of the embodiment, the dual clutch 200 is used as the changeover mechanism of the connection. The structure of the dual clutch has a small dimension along the axis of rotation and thereby desirably reduces the size of the whole power system including the changeover mechanism. The use of the dual clutch enables the connection of the assist motor 140 to be changed without causing the assist motor 140 to be disconnected from both the engine 150 and the clutch motor 130. This arrangement advantageously improves the response of the vehicle as discussed below.

The hybrid vehicle of the embodiment makes the revolving speeds of the three rotating shafts linked with the dual clutch 200 substantially identical with one another, and subsequently carries out the changeover of the clutches via the state in which both the inner clutch and the outer clutch are set in the coupled state. This arrangement effectively prevents the assist motor 140 from being disconnected from both the engine 150 and the clutch motor 130 in the course of the changeover of the clutches, and thus ensures a sufficient output torque even during the changeover process. The changeover control process discussed above carries out the changeover of the clutches after making the revolving speeds of the three rotating shafts sufficiently close to one another. This procedure significantly shortens the time period in which the assist motor 140 is disconnected from both the engine 150 and the clutch motor 130. Although the embodiment carries out the changeover of the clutches via the state in which both the clutches are set in the coupled state, the changeover of the clutches may thus be carried out via the state in which the assist motor 140 is released from both the engine 150 and the clutch motor 130. This modified application also ensures a sufficient output torque.

Figure 25:
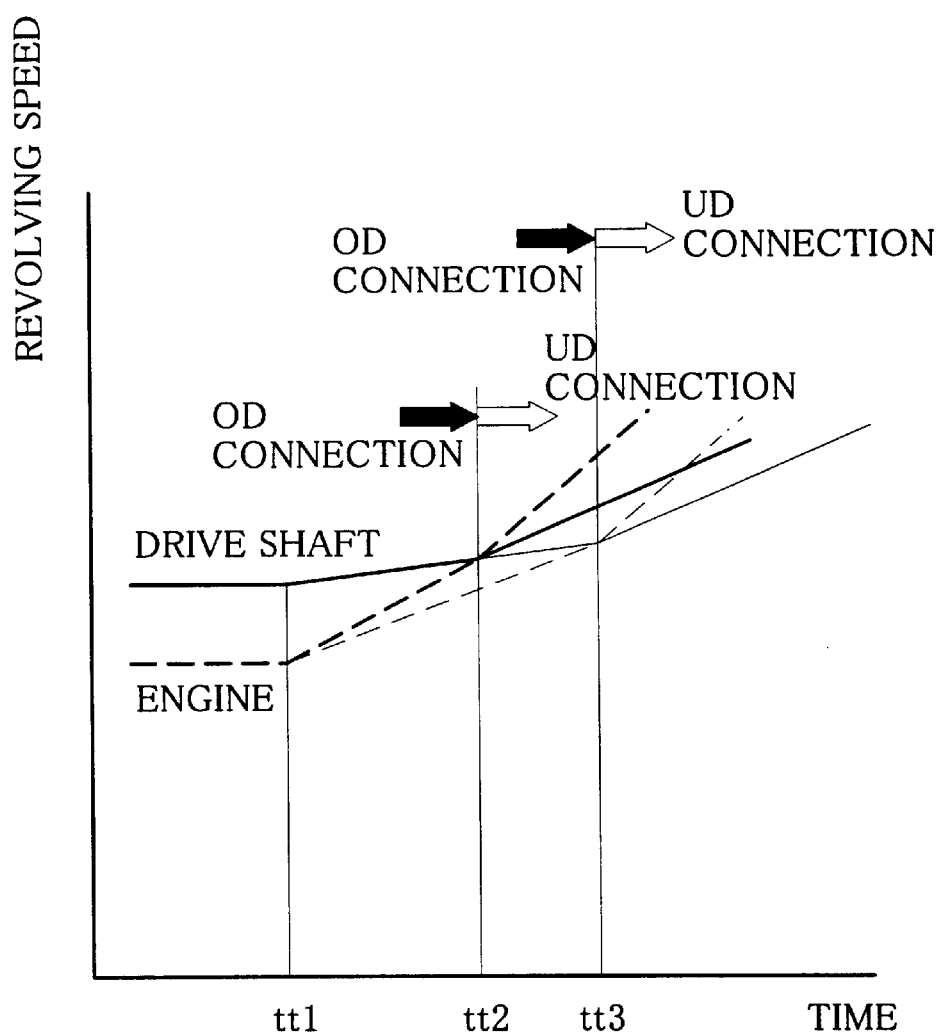
FIG. 25 is a graph showing a variation in revolving speed in the changeover process.

The technique of the embodiment carries out the voltage regulation of the released clutch (see step S112 in the flowchart of FIG. 18) in the changeover control process, thereby shortening the time required for completion of the changeover. FIG. 25 is a graph showing a variation in revolving speed in the changeover process. The solid lines represent time variations in revolving speed of the drive shaft, whereas the broken lines represent time variations in revolving speed of the engine. The thicker lines represent the variations in the case where the voltage regulation of the released clutch is carried out. The thinner lines represent the variations without the voltage regulation.

At a time point tt1, the accelerator pedal is abruptly stepped on in the state of the overdrive connection (OD) to start the changeover control process. The vehicle is accelerated with a step-on of the accelerator pedal, so that the revolving speed of the drive shaft gradually rises. The revolving speed of the engine also rises through the regulation of the assist motor 140 and the regulation of the released clutch. In the case without the regulation of the released clutch, the revolving speed of the engine gradually rises to be substantially coincident with the revolving speed of the drive shaft at a time point tt3 as shown by the thinner lines. At this time point tt3, the connecting state is changed from the overdrive connection to the underdrive connection, so as to enable the assist motor 140 to output an additional torque for acceleration. The acceleration then proceeds along the thinner lines.

In the case with the regulation of the released clutch, on the other hand, the power of the rotations of the drive shaft is transmitted to raise the revolving speed of the engine. The revolving speed of the engine thus rises quickly to be coincident with the revolving speed of the drive shaft at a time point tt2 as shown by the thicker lines. The time point tt2 is earlier than the time point tt3. At this time point tt2, the connecting state is changed from the overdrive connection to the underdrive connection. The acceleration then proceeds along the thicker lines. As clearly understood from the comparison between the thicker lines and the thinner lines, the regulation of the released clutch ensures the quicker changeover of the clutches and the quicker subsequent acceleration. The hybrid vehicle of the embodiment thus attains the smooth acceleration with a high response.

I. Modifications

The above embodiment applies the clutch motor for the power regulation unit. The power regulation unit varies the magnitude of the power output from the engine 150 through the input and the output of electric power. The clutch motor 130 raises the revolving speed with a supply of electric power and lowers the revolving speed through regeneration of electric power, so as to vary the power output from the engine 150 and transmit the varied power to the axle 116. The power regulation unit is not restricted to the clutch motor 130 but may be any of various apparatuses that exert the above effects. The following describes a modified example using a power regulation unit of another configuration.

Figure 26:
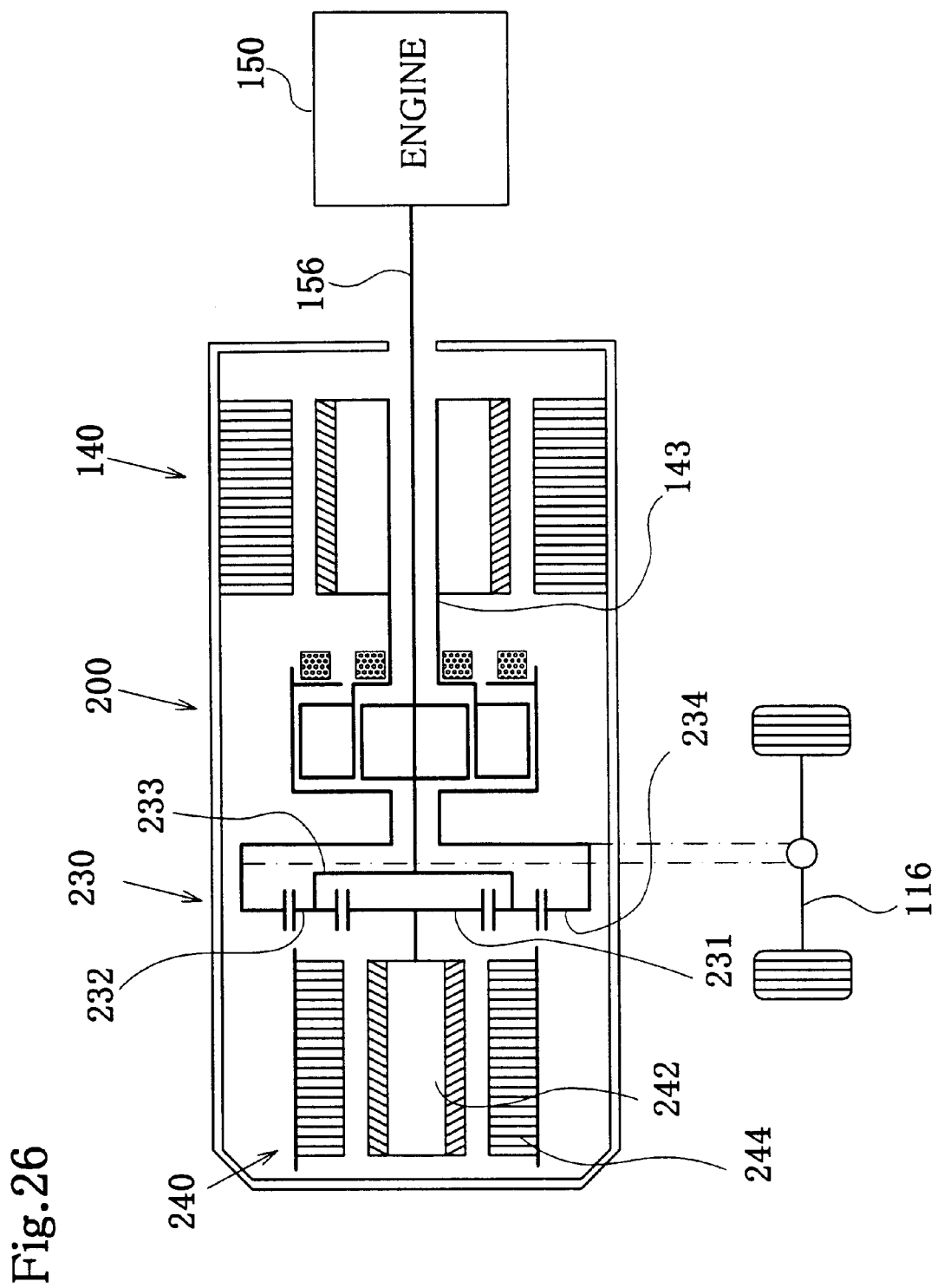
FIG. 26 schematically illustrates the structure of a hybrid vehicle in one modified example.

FIG. 26 schematically illustrates the structure of a hybrid vehicle in one modified example. Only the constituents relating to the power transmission are shown here, whereas the electric system including the control unit and the driving circuits is omitted from the illustration. In this modified example, the clutch motor 130 is replaced by a planetary gear unit 230 and a motor generator 240. The other configuration is identical with that of the hybrid vehicle of the embodiment shown in FIG. 1.

The planetary gear unit 230 includes a sun gear 231 that rotates on the center, a planetary pinion gear 232 that rotates on its axis, a planetary carrier 233 that supports the planetary pinion gear 232 to be rotatable round the sun gear 231, and a ring gear 234 that revolves round the planetary carrier 233. The sun gear 231 of the planetary gear unit 230 is linked with a rotor 242 of the motor generator 240. The planetary carrier 233 is linked with the crankshaft 156 of the engine 150 and the inner shaft of the dual clutch 200. The ring gear 234 is linked with the outer shaft of the dual clutch 200 and connected with the axle 116 via a chain belt and a differential gear.

Like the assist motor 140, the motor generator 240 is a three-phase synchronous motor and has a stator 244 fixed to the casing. The motor generator 240 functions either as a motor or a generator. The operations of the motor generator 240 are controlled by the on-off operations of transistors included in a driving circuit in the same manner as the clutch motor 130 of the embodiment.

In the planetary gear unit 230, as is known from the mechanics, determining the rotating states of two among the sun gear 231, the planetary carrier 233, and the ring gear 234 unequivocally specifies the rotating state of the residual one. Based on such characteristics, in the hybrid vehicle of the modified example, the combination of the planetary gear unit 230 with the motor generator 240 ensures the functions similar to those of the clutch motor 130 of the embodiment shown in FIG. 1, that is, attains the functions of the power regulation unit. The planetary carrier 233 corresponds to the inner rotor of the clutch motor 130, and the ring gear 234 corresponds to the drive shaft.

The input of the power from the engine 150 into the planetary carrier 233 rotates the ring gear 234 and the sun gear 231. One of the rotations of the ring gear 234 and the sun gear 231 may be ceased. The rotation of the ring gear 234 causes part of the power output from the engine 150 to be transmitted in a mechanical form to the axle 116. The rotation of the sun gear 231 causes the motor generator 240 to be driven with part of the power output from the engine 150 and regenerate electric power. The motor generator 240 carries out the power running to mechanically transmit the torque output from the motor generator 240 to the axle 116 via the sun gear 231, the planetary carrier 233, and the ring gear 234. The power running of the motor generator 240 accordingly enhances the torque output from the engine 150 and outputs the enhanced torque to the axle 116.

As described above, in the hybrid vehicle of the modified example, the combination of the planetary gear unit 230 with the motor generator 240 varies the power input into the planetary carrier 233 through the input and the output of electric power and outputs the varied power to the ring gear 234. The revolving speeds of the sun gear 231 and the ring gear 234 are arbitrarily changed under the restricting conditions corresponding to the gear ratio, so that the power output from the engine 150 is converted into a diversity of revolving speeds and output to the ring gear 234.

Figure 27:
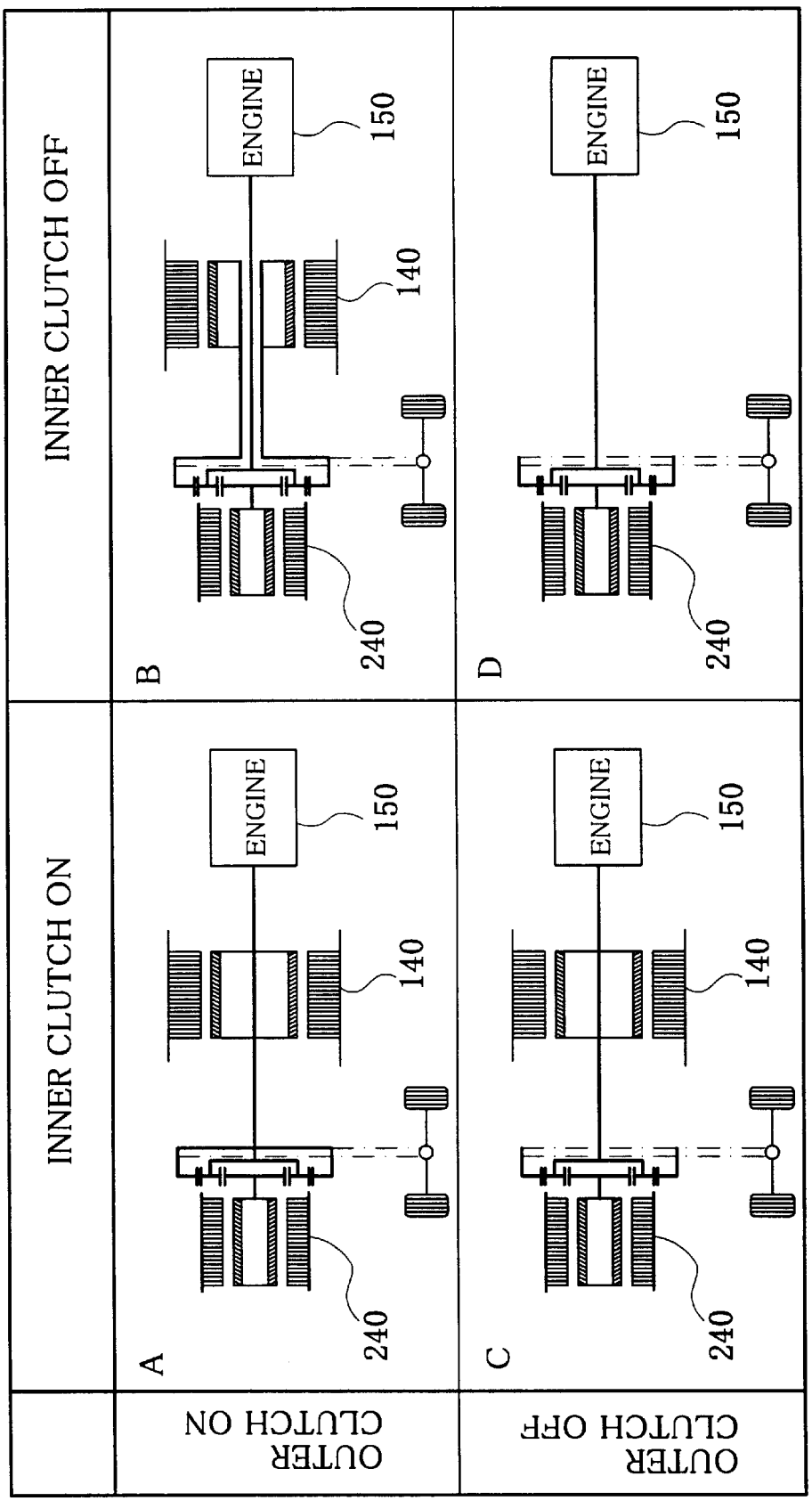
FIG. 27 shows the state of the power system under the respective on-off conditions of the dual clutch in the hybrid vehicle of the modified example.

Like the hybrid vehicle of the embodiment discussed above, the hybrid vehicle of the modified example attains four different connecting states A through D by changing the coupling state of the dual clutch 200. FIG. 27 shows the state of the power system under the respective on-off conditions of the dual clutch 200 in the hybrid vehicle of the modified example. In the connecting state A, both the inner clutch and the outer clutch are in ON position. The planetary carrier 233 and the ring gear 234 of the planetary gear unit 230 rotate integrally, so that all the gears of the planetary gear unit 230 rotate integrally. The connecting state A is thus equivalent to the configuration in which the motor generator 240 does not function and the engine 150 and the assist motor 140 are directly linked with the drive shaft. The connecting state A in the modified structure corresponds to the connecting state A in the structure of the embodiment (see FIG. 10).

In the connecting state B, the inner clutch is in OFF position and the outer clutch is in ON position. Since only the outer clutch gains coupling, the connecting state B is equivalent to the configuration in which the assist motor 140 is linked with the ring gear 234. The ring gear 234 corresponds to the outer rotor of the clutch motor 130 in the embodiment, so that the connecting state B in the modified structure corresponds to the connecting state B in the structure of the embodiment. The hybrid vehicle of the modified example attains the underdrive connection by setting off the inner clutch and setting on the outer clutch.

In the connecting state C, the inner clutch is in ON position and the outer clutch is in OFF position. Since only the inner clutch gains coupling, the connecting state C is equivalent to the configuration in which the assist motor 140 is linked with the engine 150. The connecting state C in the modified structure corresponds to the connecting state C in the structure of the embodiment. The hybrid vehicle of the modified example attains the overdrive connection by setting on the inner clutch and setting off the outer clutch.

In the connecting state D, both the inner clutch and the outer clutch are in OFF position. In this case, the assist motor 140 is completely separated from the other constituents, and only the engine 150, the planetary gear unit 230, and the motor generator 240 are connected with one another. The connecting state D in the modified structure corresponds to the connecting state D in the structure of the embodiment.

As discussed above, like the hybrid vehicle of the embodiment, the hybrid vehicle of the modified example attains the underdrive connection and the overdrive connection by changing the coupling state of the dual clutch 200. The control procedures carried out in the hybrid vehicle of the embodiment are applicable for the hybrid vehicle of the modified example.

The dual clutch 200 adopted in the embodiment discussed above includes the inner electromagnetic clutch unit that connects and disconnects the middle shaft with and from the inner shaft, and the outer electromagnetic clutch unit that connects and disconnects the middle shaft with and from the outer shaft. Each of the inner electromagnetic clutch unit and the outer electromagnetic clutch unit satisfies the following requirements. The first requirement is that the two shafts of interest, which are to be connected and disconnected, have cross sectional shapes that allow the interval between the opposing faces in the radial direction to be varied according to the position in the circumferential direction. The second requirement is that rollers having a diameter between the maximum value and the minimum value of the interval are provided between the two shafts of interest. The third requirement is that a support member is linked with one out of the two shafts of interest to allow relative rotations thereof to support the rollers. The fourth requirement is that a first frictional coupling member and a second frictional coupling member are provided, where the first frictional coupling member is fixed to the other out of the two shafts of interest and the second frictional coupling member is linked with the support member to prohibit relative rotations thereof to be in contact with and separate from the frictional surface by the function of electromagnetic force. The fifth requirement is that electromagnets are provided to apply the electromagnetic force to the second frictional coupling member.

The middle shaft has a large-diametral portion and a small-diametral portion arranged across the radially-extending side face that is perpendicular to the axis of rotation. The radially-extending side face functions as the first frictional coupling member of either the inner electromagnetic clutch unit or the outer electromagnetic clutch unit. This arrangement desirably reduces the size of the changeover mechanism. The changeover mechanism of the present invention is not restricted to this configuration, but application of such roller clutches advantageously enables a relatively large torque to be transmitted by a relatively small-sized mechanism. A variety of configurations other than the configuration of the embodiment are applicable to the dual clutch having the characteristics discussed above. A variety of configurations are applicable to the connection of the dual clutch, the assist motor, the engine, and the drive shaft, under the restrictions that the rotating shaft of the assist motor is linked with the middle shaft and that the output shaft and the drive shaft are connected with the inner shaft and the outer shaft by the one-to-one mapping. Some of the applicable configurations are discussed below as modified examples.

Figure 28:
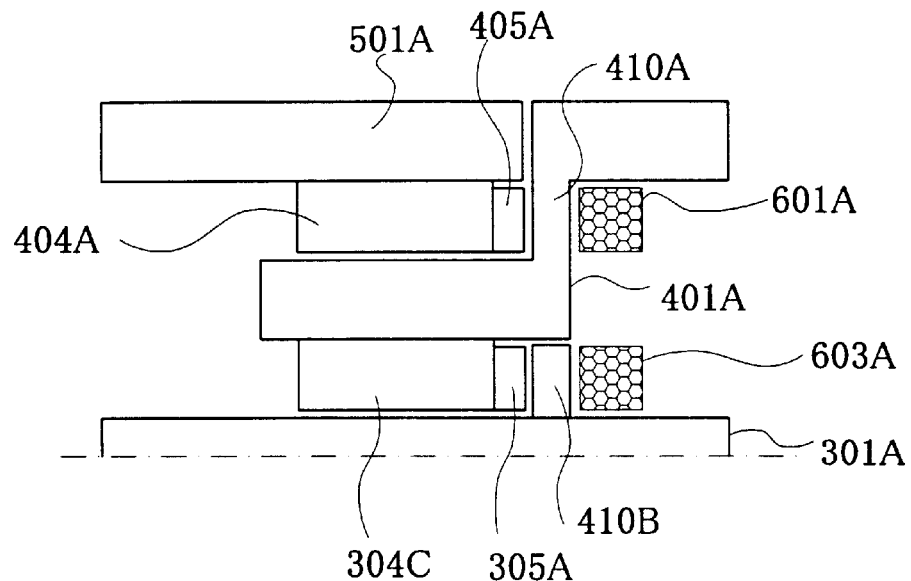
FIG. 28 illustrates the structure of a dual clutch in a first modified example.

FIG. 28 illustrates the structure of a dual clutch in a first modified example. Only the schematic structure is shown here and the details are omitted from the illustration. The embodiment discussed above has the cam and the other related constituents incorporated in the large-diametral portion of the middle shaft 401. The first modified example has a cam and related constituents incorporated in a small-diametral portion of a middle shaft 401A.

Like the middle shaft 401 of the embodiment, the middle shaft 401A of the first modified example has a small-diametral portion and a large-diametral portion arranged across a radially-extending side face 410A. Unlike the structure of the embodiment, rollers 304C and a support member 305A included in an inner clutch unit are incorporated in the small-diametral portion of the middle shaft 401A. Two coils 601A and 603A respectively included in the inner clutch unit and an outer clutch unit are fixed between the large-diametral portion of the middle shaft 401A and an inner shaft 301A. In the dual clutch of the first modified example, rollers 404A and a support member 405A included in the outer clutch unit are mounted on the inner circumferential face of an outer shaft 501A. Unlike the structure of the embodiment, the radially-extending side face 410A of the middle shaft 401A functions as a frictional coupling member of the outer clutch unit. A ring 410B fixed to the inner shaft 301A functions as a frictional coupling member of the inner clutch unit. In the dual clutch of this modified structure, supply of electricity to the coils 601A and 603A causes the middle shaft 401A to be connected with and disconnected from the inner shaft 301A and the outer shaft 501A. The use of the middle shaft 401A having the radially-extending side face 410A desirably reduces the size of the whole changeover system.

Figure 29:
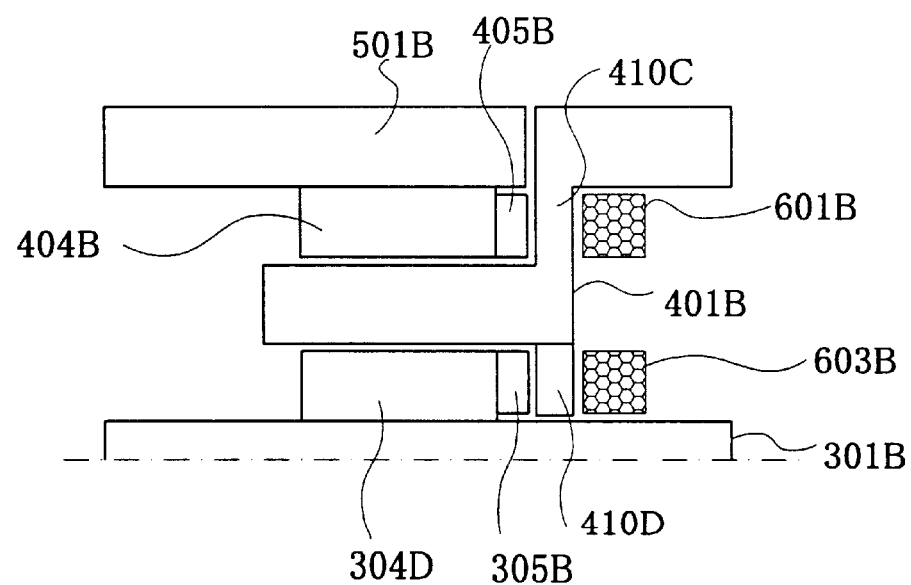
FIG. 29 illustrates the structure of another dual clutch in a second modified example.

FIG. 29 illustrates the structure of another dual clutch in a second modified example. The difference from the embodiment and the first modified example is that the second modified example has frictional coupling members of both an inner clutch unit and an outer clutch unit fixed to a middle shaft 401B.

Like the middle shaft 401A of the first modified example, the middle shaft 401B of the second modified example has a small-diametral portion and a large-diametral portion arranged across a radially-extending side face 410C. Rollers 304D and a support member 305B included in the inner clutch unit are attached to an inner shaft 301B. Rollers 404B and a support member 405B included in the outer clutch unit are mounted on an outer shaft 501B. Two coils 601B and 603B respectively included in the inner clutch unit and the outer clutch unit are fixed between the large-diametral portion of the middle shaft 401B and the inner shaft 301B. The radially-extending side face 410C of the middle shaft 401B functions as a frictional coupling member of the outer clutch unit. The middle shaft 401B is provided with a restriction mechanism of a magnetic circuit like the structure of the embodiment, so as to enable the magnetic force of the coil 601B to be adequately applied to the outer clutch unit. A ring 410D is fixed to the middle shaft 401B on the center side of the rotating shaft of the radially-extending side face 410C. The ring 410D functions as a frictional coupling member of the inner clutch unit. The technique of the present invention may be attained in this configuration. The ring 410D may be formed integrally with the middle shaft 401B.

Electromagnetic roller clutches are discussed above as the modified examples of the dual clutch 200. The dual clutch 200 is, however, not restricted to these structures. A variety of configurations are applicable to the dual clutch 200, as long as the inner shaft, the middle shaft, and the outer shaft are arranged concentrically and clutch mechanisms are disposed respectively inside and outside the middle shaft. The inner clutch and the outer clutch may be electromagnetic clutches in which clutch plates are attracted and separated by the function of electromagnetic force. The clutches may be driven by the hydraulic pressure instead of the electromagnetic force.

The present invention is not restricted to the above embodiment or its modifications, but there may be many other modifications, changes, and alterations without departing from the scope or spirit of the main characteristics of the present invention. For example, the gasoline engine 150 used in the hybrid vehicle of the embodiment may be replaced by another power source, such as a diesel engine. The embodiment applies the three-phase synchronous motors for all the motors mounted on the hybrid vehicle. Other motors including induction motors, other a.c. motors, and d.c. motors are also applicable for the motors. In the embodiment discussed above, the CPU executes the software programs to carry out the various control procedures. The controls may, however, be attained by a hardware configuration. In the embodiment, the main control unit 190 is in charge of the changeover of the connecting state. One possible modification manually changes the connecting state. Another possible modification selectively carries out a manual changeover and an automatic changeover of the connecting state.

The scope and spirit of the present invention are limited only by the terms of the appended claims.

What is claimed is:

1. A hybrid vehicle comprising:
   an engine having an output shaft;
   a drive shaft from which power is output to wheels;
   a power regulation unit, connected with both said output shaft and said drive shaft, configured to transmit mechanical power output from said engine to said drive shaft while varying the transmitted mechanical power to the drive shaft through mechanical-electrical power conversion;
   a motor having a rotating shaft; and
   a changeover mechanism that changes connection of said rotating shaft of said motor between said output shaft and said drive shaft, said changeover mechanism being a dual clutch that comprises a first clutch and a second clutch respectively contained within and not contained within said rotating shaft of said motor, said first clutch connecting and disconnecting said rotating shaft with and from said output shaft, said second clutch connecting and disconnecting said rotating shaft with and from said drive shaft.

2. A hybrid vehicle in accordance with claim 1, wherein said changeover mechanism is a dual clutch actuated by electromagnetic force.

3. A hybrid vehicle in accordance with claim 2, wherein said first clutch and said second clutch are roller clutches.

4. A hybrid vehicle in accordance with claim 2 comprising:
   a changeover controller configured to control said changeover mechanism responsive to driving conditions of said hybrid vehicle and a connecting state of said motor.

5. A hybrid vehicle in accordance with claim 4, wherein said changeover controller controls said changeover mechanism to carry out the changeover when an increment of a required torque for said drive shaft is not less than a predetermined level while said motor is connected with said output shaft.

6. A hybrid vehicle in accordance with claim 4, wherein said changeover controller comprises:
   a first controller configured to cause a released one of said the first and second clutches to be engaged when a difference between rotating states of two shafts linked with said released clutch is in an allowable range, thus reducing the difference between the rotating states of said two shafts; and
   a second controller configured to change an engaging state of the released clutch when it is determined that the rotating states of said two shafts satisfy a predetermined coupling condition with regard to said released clutch.

7. A hybrid vehicle in accordance with claim 6, wherein said first controller increases an engaging force with which said released clutch to be engaged as a revolving speed difference between said two shafts decreases.

8. A hybrid vehicle in accordance with claim 6, wherein said first controller varies an engaging force of said released clutch in a stepwise manner.

9. A hybrid vehicle in accordance with claim 8, wherein said changeover mechanism comprises a roller clutch actuated with electromagnetic force to attain at least three different coupling states, including a released state, a fully engaged state to allow transmission of a torque via a roller, and a partly engaged state to allow transmission of a smaller torque by means of a frictional force than the torque transmittable in the fully engaged state,
   said first controller causing said released clutch to engage in the partly engaged state.

10. A hybrid vehicle in accordance with claim 6, wherein said first controller causes said released clutch to be engaged while varying a engaging force of said released clutch in a fluctuating manner.

11. A hybrid vehicle in accordance with claim 10, wherein said changeover mechanism comprises a roller clutch that is changeable between a released state and a engaged state with electromagnetic force, and
   said first controller causes said roller clutch to be engaged in an intermittent manner.

12. A hybrid vehicle in accordance with claim 4, wherein said changeover controller causes said changeover mechanism to implement the changeover via a state in which both said first clutch and said second clutch are in a engaged state.

13. A hybrid vehicle in accordance with claim 1, wherein said power regulation unit comprises a pair-rotor motor having a first rotor linked with said output shaft and a second rotor linked with said drive shaft.

14. A hybrid vehicle in accordance with claim 1, wherein said power regulation unit comprises:
   a generator having a rotor shaft; and
   a planetary gear having three rotating shafts, which are respectively linked with said output shaft, said drive shaft, and said rotor shaft.

* * * * *